(12) United States Patent
Ponce de Leon

(10) Patent No.: US 8,400,467 B1
(45) Date of Patent: Mar. 19, 2013

(54) GRAPHICAL PLANNING AND SCHEDULING SYSTEM

(75) Inventor: Gui Ponce de Leon, Ann Arbor, MI (US)

(73) Assignee: PMA Technologies, LLC, Ann Arbor, MI (US)

( * ) Notice: Subject to any disclaimer, the term of this patent is extended or adjusted under 35 U.S.C. 154(b) by 877 days.

(21) Appl. No.: 12/387,469

(22) Filed: May 1, 2009

Related U.S. Application Data

(60) Provisional application No. 61/049,738, filed on May 1, 2008, provisional application No. 61/088,282, filed on Aug. 12, 2008, provisional application No. 61/103,904, filed on Oct. 8, 2008, provisional application No. 61/107,653, filed on Oct. 22, 2008.

(51) Int. Cl.
   *G09G 5/14* (2006.01)
(52) U.S. Cl. .................................................. 345/619
(58) Field of Classification Search .................. 345/619
   See application file for complete search history.

(56) References Cited

U.S. PATENT DOCUMENTS

| | | | | |
|---|---|---|---|---|
| 5,016,170 A | * | 5/1991 | Pollalis et al. | 705/7.15 |
| 5,101,340 A | * | 3/1992 | Nonaka et al. | 717/109 |
| 6,714,829 B1 | * | 3/2004 | Wong | 700/101 |
| 6,732,114 B1 | * | 5/2004 | Aamodt et al. | 715/243 |
| 7,113,915 B1 | * | 9/2006 | Montemayor et al. | 705/7.13 |
| 7,721,303 B2 | * | 5/2010 | Alves de Moura et al. | 719/328 |
| 7,881,920 B2 | * | 2/2011 | Abu El Ata et al. | 703/22 |
| 2003/0067491 A1 | * | 4/2003 | Cadwallader | 345/779 |
| 2006/0072505 A1 | * | 4/2006 | Carrillo et al. | 370/331 |
| 2006/0200372 A1 | * | 9/2006 | O'Cull et al. | 705/8 |
| 2008/0103871 A1 | * | 5/2008 | Ruehl et al. | 705/9 |
| 2009/0112668 A1 | * | 4/2009 | Abu El Ata | 705/7 |
| 2009/0119062 A1 | * | 5/2009 | Owens et al. | 702/176 |
| 2009/0125359 A1 | * | 5/2009 | Knapic et al. | 705/8 |
| 2009/0132322 A1 | * | 5/2009 | Clark | 705/8 |
| 2010/0010856 A1 | * | 1/2010 | Chua et al. | 705/8 |
| 2011/0231169 A1 | * | 9/2011 | Furem et al. | 703/2 |

OTHER PUBLICATIONS

The Critical Path Method. Presented by Antonio Prensa,. MBA, PMP, CCP, CSTE for Project. Management Institute Puerto Rico. Chapter. Jun. 20, 2002.*

* cited by examiner

*Primary Examiner* — Javid A Amini

(74) *Attorney, Agent, or Firm* — Carlson, Gaskey & Olds PC

(57) ABSTRACT

A graphical planning and scheduling system is described. The system is based on the Graphical Planning Method and object oriented principles. The system is graphics-driven and may support gestural and surface computing. The system may allow resource leveling, schedule optimization, and time/cost tradeoffs to occur interactively on a display and in conjunction with network construction. The system may allow forward and backward planning and scheduling of projects. The system may also allow project stakeholders to interactively participate in collaborative planning and scheduling sessions.

23 Claims, 21 Drawing Sheets

GRAPHICAL PLANNING AND SCHEDULING SYSTEM

REFERENCE TO RELATED APPLICATIONS

This application claims the benefit of the filing date under 35 U.S.C. §119(e) of U.S. Provisional Application Ser. Nos. 61/049,738, entitled "Interactive Graphics-Based Planning Systems", filed May 1, 2008, 61/088,282, entitled "Interactive Graphics-Based Planning Systems", filed Aug. 12, 2008, 61/103,904, entitled "Interactive Graphics-Based Planning Systems", filed Oct. 8, 2008, and 61/107,653, entitled "Interactive Graphics-Based Planning Systems", filed Oct. 22, 2008.

COMPUTER PROGRAM LISTING APPENDIX

A computer program listing appendix is filed herewith this application. The computer program listing appendix is hereby expressly incorporated by reference.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

BACKGROUND

The planning and scheduling steps to any project may impact the success, profitability and/or outcome of the project. An accurate project schedule aids in the decision making process and allocation of resources, quantifies goals and establishes a means of measuring success, and ensures that the project is carried out in a manner consistent with the values and priorities of the project stakeholders, that is any person having interest in the project, for example, project managers, superintendents, key subcontractors, etc.

In the construction industry, a project for constructing a building or a highway may last for several years and contain hundreds of activities and milestones that must be planned and scheduled to effectively complete the project. During the planning and scheduling processes, the activities and milestones must often be shifted, crashed, extended, or deleted to create a workable schedule. Any miscalculation could result in project delays, monetary losses and/or lawsuits. Moreover, after the project commences, there are typical delays due to weather, limited resources, etc., which may affect the start and/or finish times of future activities, and could result in an overall delay of the project if not properly accounted for in the schedule. Accordingly, the schedule may require updating during the life of the project so that adjustments can be made to address delays.

The Critical Path Method ("CPM") has been the dominant scheduling paradigm in project management for many years. CPM is a scheduling system that is based on complex mathematical algorithms. CPM receives as inputs a list of activities required to complete a project, the duration of each activity and a dependency relationship between the activities. CPM stores the information in databases and utilizes inline scheduling engines to carry out schedule calculations in a succession of batch modes. To modify the schedule, the scheduler must input the modification into CPM and "wait and see" the effects on the regenerated schedule. This approach is inefficient for schedulers and project stakeholders to modify, rearrange or optimize a schedule after it has been created.

Accordingly, project stakeholders are encouraged to plan the schedule beforehand and pass the information to a trained scheduler who inputs the activities into CPM. However, this disconnected approach to planning and scheduling often results in schedules that are unworkable or that defy logic. Only through laborious planning or trial and error through CPM applications are realistic project schedules achieved.

DEFINITIONS

An activity refers to a positioned Graphical Planning Method ("GPM") object with assigned duration representing a discrete portion of the work, with or without assigned resources and cost attributes, or a zero-resource restraint to another activity.

A benchmark refers to a GPM event object designating a deadline of the project or used to "cut" floats or drifts, if floats or drifts are to be allocated to the phase defined by the benchmark versus accumulating from schedule completion, or to project start.

A constant embed offset is measured in terms of elapsed days from the start of the host activity (predecessor for SS logic) and in terms of remaining days to the finish of the host activity (successor for FF logic). If the host activity duration varies in any way, the embed remains constant. A constant embed is intended to model a fixed interval from the start of the predecessor to the embed (SS logic) or from the finish of the successor to the embed (FF logic). In that sense, the constant embeds are consistent with the usual intent of the relationship type.

The phrase "coupled with" is defined to mean directly connected to or indirectly connected through one or more intermediate components. Such intermediate components may include both hardware and software based components.

The term crash refers to a reduction in the duration of an activity.

The phrase "critical path" refers to a grouping of interdependent activities and/or milestones where any slippage results in an extension of the project start or completion dates.

Data-dates model a point in time, for example a particular day to where the project has progressed, that is all activities prior to the data-date have been completed or started.

Drift refers to a GPM calculated activity and milestone attribute that measures by how many days an activity or milestone may backslide to an earlier position without forcing an earlier project start.

An embedded node, or embed, refers to an event object intermediate of, or right on, the start or finish node of an activity, through which the activity is connected to a successor start node, from a predecessor finish node, to/from an embed of another activity, or to a milestone or benchmark. An embed is generally offset, defined below, from the finish or start node. An embed may have a proportionate, constant or reverse offset, as defined herein.

Float refers to a GPM calculated activity, milestone (if constrained) and benchmark attribute that measures by how many days an activity, milestone (if constrained) and benchmark may slip beyond its position without extending the overall schedule completion. An analogous concept to CPM total float, except it is measured with respect to planned dates as opposed to conventional "CPM early dates."

Gap refers to a GMP calculated relationship attribute measuring the leeway in a logic relationship. Gap represents the number days a predecessor activity may slide beyond its position or extend without delaying the successor activity's or milestone's position.

A logic relationship represents time-specific interconnection between two dependent activities, benchmarks and/or milestones.

A milestone refers to a GPM event object dating a key point in the schedule, which, if constrained, distributes the overall duration of the project to preset stages, and, if unconstrained, reflects the current forecasted date for the milestone. The milestone is adjustable up to an optional constraint date that defines its window of float or drift. The milestone may also be constrained by a logic relationship.

As used herein, the term milestone has a meaning that is different from how it is used in CPM. Milestones in GPM may act as tracking objects. Constraints on a start milestone define a "no later than" ("NLT") limit to which the start milestone can move. If a NLT constraint has been set, it will snap to the earlier of the NLT date or the earliest start of its successors. If a start milestone has no successors or NLT constraint, then it will not snap to any date. Likewise, a constraint on a finish milestone defines the "no earlier than" ("NET") date limit to which the finish milestone can move. If a NET constraint has been set the milestone and linked to an activity, it snaps to the latest finish of its predecessors or NET constraint date, whichever is later. If a finish milestones has no predecessors attached to it or has no constraint defined, it will not snap to any date.

Offsets are required, minimum intervals between connected dates of two interconnected activities. For example, an FS offset denotes the interval between the finish of the predecessor and the start of the successor; an SS offset denotes the interval between the start of the predecessor and the start of the successor; and so forth for FF and SF logic relationships.

A proportionate embed offset is defined in terms of a percentage of the host activity duration. The host activity is the predecessor for SS logic and the successor for FF logic. If the host activity varies in any way, the embed adjusts proportionately. A proportionate embed is intended to model the percent of the activity duration that must be completed for the successor to be allowed to start (SS logic) or percent of the successor activity duration remaining after the predecessor completes (FF logic).

A reverse embed offset is measured in terms of elapsed days to the finish of the host activity (predecessor for SS logic) and in terms of days from the start of the host activity (successor for FF logic). If the host activity duration varies in any way, the embed remains constant. For any host activity at issue, a reverse embed is the complement of a constant embed.

For explanation purposes, the system is primarily described in terms of projects in the field of construction and based on time increments of a single day. However, it will be appreciated that the system may be used in connection with any time-based project and in any field of use. The system may also be based on any time increments, for example, seconds, minutes, hours, weeks, months, years, or other time increments.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

The present invention is based on the discovery of the Graphical Planning Method ("GPM"). GPM represents a paradigm shift from traditional planning systems. GPM is an object-centric, graphics-driven planning and scheduling method. GPM relies on objects, such as activities, milestones, logic relationships and benchmarks, to develop a network schedule, as opposed to relying on tables of activities, contrived dates and scheduling engines that use batch processing methods. GPM includes the Logic Diagramming Method ("LDM"), which combines the simplicity of the line and arrow technique associated with the Arrow Diagramming Method ("ADM"), with the flexibility of the start-to-start ("SS"), finish-to-finish ("FF") and start-to-finish ("SF") logic relationships associated with the Precedent Diagram Method ("PDM"). LDM also adds the ability to create logic relationships through embedded nodes, which may be created intermediate of, or right on, the start and finish nodes of an activity. GPM is described in commonly owned U.S. Publication No. 2008/0195452, entitled "Interactive Graphics-Based Planning Systems," filed on Feb. 11, 2008.

GPM fundamentally differs from CPM scheduling systems by providing evolving dates, floats, resource profiles and cost curves in real time to a user, while the user is constructing the schedule. With GPM, the planning and scheduling steps are consolidated, which increases network construction efficiency and accuracy. Moreover, combining GPM with an interactive display creates a kinetic linkage between the visual representation of the plan and the abstract cognition of users generating the plan. Users may perform resource leveling, schedule optimization, and time/cost tradeoffs interactively on the display and simultaneously with network construction. GPM algorithms also allow users to switch from constructing network schedules forward from release dates to backwards from target dates and vice versa.

Figure 1:
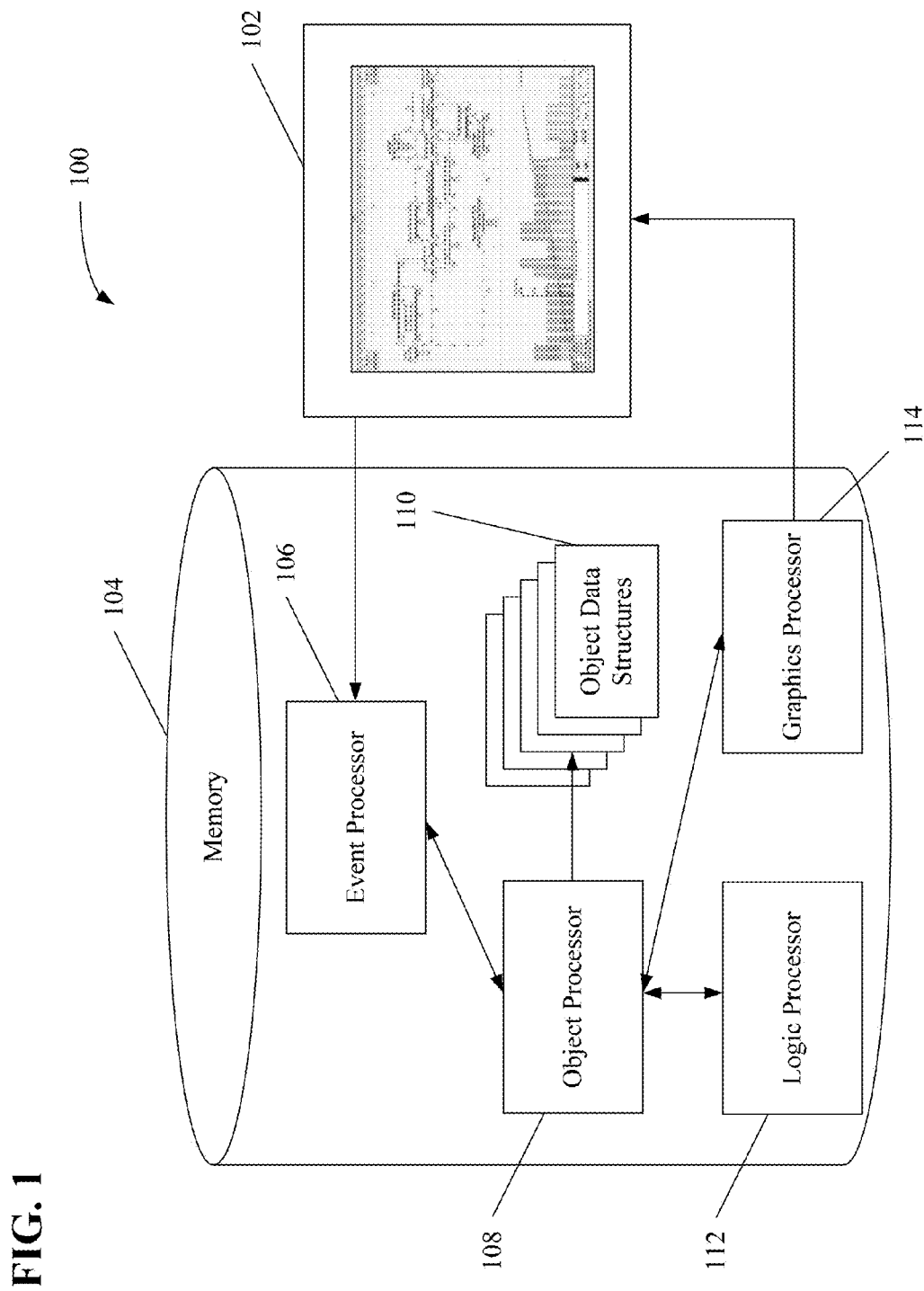
FIG. 1 is a block diagram of a graphical planning and scheduling system.

An example of a graphical planning and scheduling system 100 is shown in FIG. 1. As shown, the system 100 includes a graphical user interface ("GUI") 102, memory 104, an event processor 106, an object processor 108, object data structures 110, a logic processor 112, and a graphics processor 114. Each of the processors may be implemented in software, hardware, or a combination thereof and one or more of the processors may be integrated together or further subdivided into additional discrete components. The system 100 may be implemented in one or more computer programs executing on one or more programmable systems comprising at least one processor and at least one data storage system. Each such program may be implemented in any desired computer language to communicate with a computer system.

The system 100 may also include a network that enables the processors and/or other computing devices to communicate and pass data to and from one another. The network may include any communication method by which information may travel between computing devices. The network may include one or more of a wireless network, a wired network, a local area network ("LAN"), a wide area network ("WAN"), a direct connection such as through a Universal Serial Bus ("USB") port, and may include the set of interconnected networks that make up the Internet, an intranet, or other communication network.

The system 100 is based on object oriented principles, where the objects contain embedded rules and computational algorithms that interact with one another through message passing in order to perform planning and scheduling functions in real time.

Figure 2:
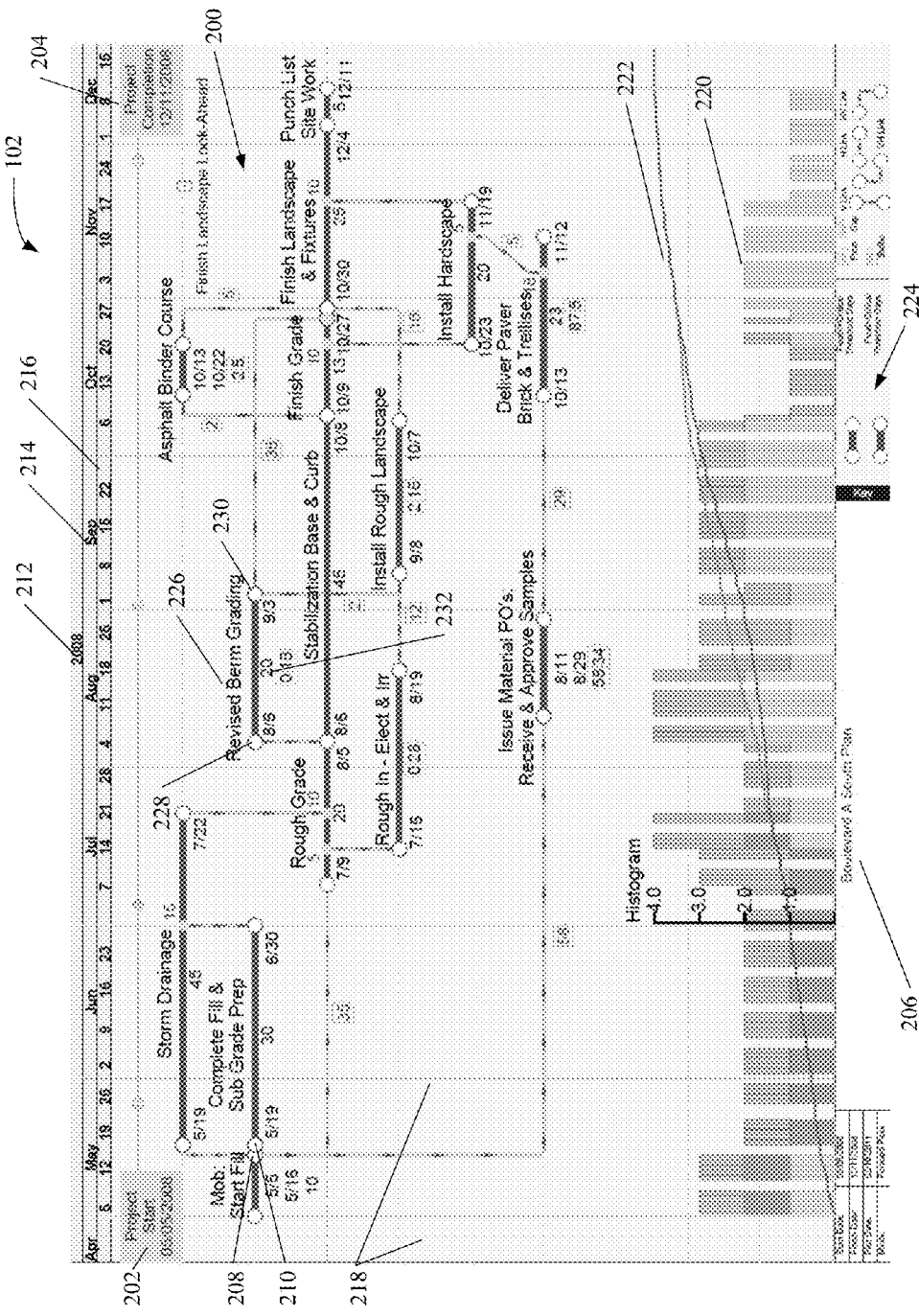
FIG. 2 shows an exemplary Graphical User Interface.

An exemplary GUI 102 used by the system is shown in FIG. 2. The GUI 102 may include one or more time-scaled displays 200, where users may interactively plan and schedule a project. The time-scaled display may be customized to mimic real-world characteristics of the project. For example, the user may customize the time-scaled display to include the project start date 202, project completion date 204, project title 206, and project calendar settings, for example, work week length, holidays, etc. In the example shown in FIG. 2, the work week length is set to five days. As shown, the finish date of activity "Mob; Start Fill" (May 16, 2008), represented by node 208 does not directly overlap with the start date of activity "Complete Fill & Sub Grade Prep" (May 19, 2008), represented by node 210. The system recognizes that there is a weekend between these activities; if the work week length was set to seven days, then nodes 208 and 210 may overlap directly.

The system may also provide default schedule attributes. The system may provide a number of project type options that the user may select, wherein each of the project type options comprise their own set of attributes that are typical for that project type. Exemplary project types may include constructing a building or highway, teaching project planning skills, writing a novel, analyzing and presenting evidence in a legal proceeding, planning a military campaign, or any other time-based project type. The system may also be designed for particular fields of use and may contain graphical information and selectable options representative of that field. The intuitive nature of the system makes it usable by a broad range of users, whether skilled in project planning or not.

The GUI 102 may contain one or more interface tools, including menus, dialog boxes, toolbars, etc. In the example shown at FIG. 2, the GUI 102 displays the calendar attributes, including year 212, month 214 and day 216. The GUI 102 may also display grid lines 218, a histogram 220 and line graphs 222 for representing resources and/or cost information, discussed below, as well as a graphical legend 224 to explain what is represented by the schedule. The GUI 102 may display other graphical and/or textual information representing aspects of the project and/or schedule. The GUI 102 may also utilize colors, color shades and/or hatching patterns to distinguish different aspects of the project and/or schedule.

The system may support gestural recognition and surface computing. In one example, the system provides an interactive GUI display that may interpret any human gestures and motions, including hand motions, arm movements, etc. The system may also support surface computing where the user may interact directly with a touch-sensitive screen via a hand, finger, or surface interactions with an electronic device, such as a stylus. For example, the user may manipulate objects on the time-scaled display 200 by touch. The system gives users the ability to witness and receive visual feedback on the impact to the schedule immediately upon any hand-directed action.

The memory 104 is coupled with the GUI 102 and processors 106, 108, 110 and 112. The memory 104 may include high-speed random access memory and/or non-volatile memory, such as one or more magnetic disk storage devices, one or more optical storage devices, and/or flash memory. The memory 104 may store communication instructions to facilitate communication of data by processors 106, 108, 110 and 112, and the GUI 102, and/or one or more additional electronic devices, one or more computers and/or one or more servers. The memory 104 may also store a plurality of instructions/rules that govern the behavior of the objects in the system. In one example, all data utilized by the system is stored locally in memory 104, without the use of databases, thereby enabling the system to quickly and efficiently utilize the data.

The event processor 106 is coupled with the GUI 102, the object processor 108 and is operable to communicate in memory 104. The event processor 102 monitors and detects events that have occurred on the system. Events refer to user actions or user interaction with the system. For example, an event may include a mouse click or movement, key press, gestural and/or surface input. Upon detection of an event, the event processor 102 may create data packets that may be processed by other components of the system to enable the other components to process the event. The event processor 102 may connect user action and interaction to the system response to the action. The response portion of the system may be referred to as the response unit. The response unit may include the object processor 108, the logic processor 112, the graphics processor 114, or other response components of the system, or any combination thereof.

Figure 3:
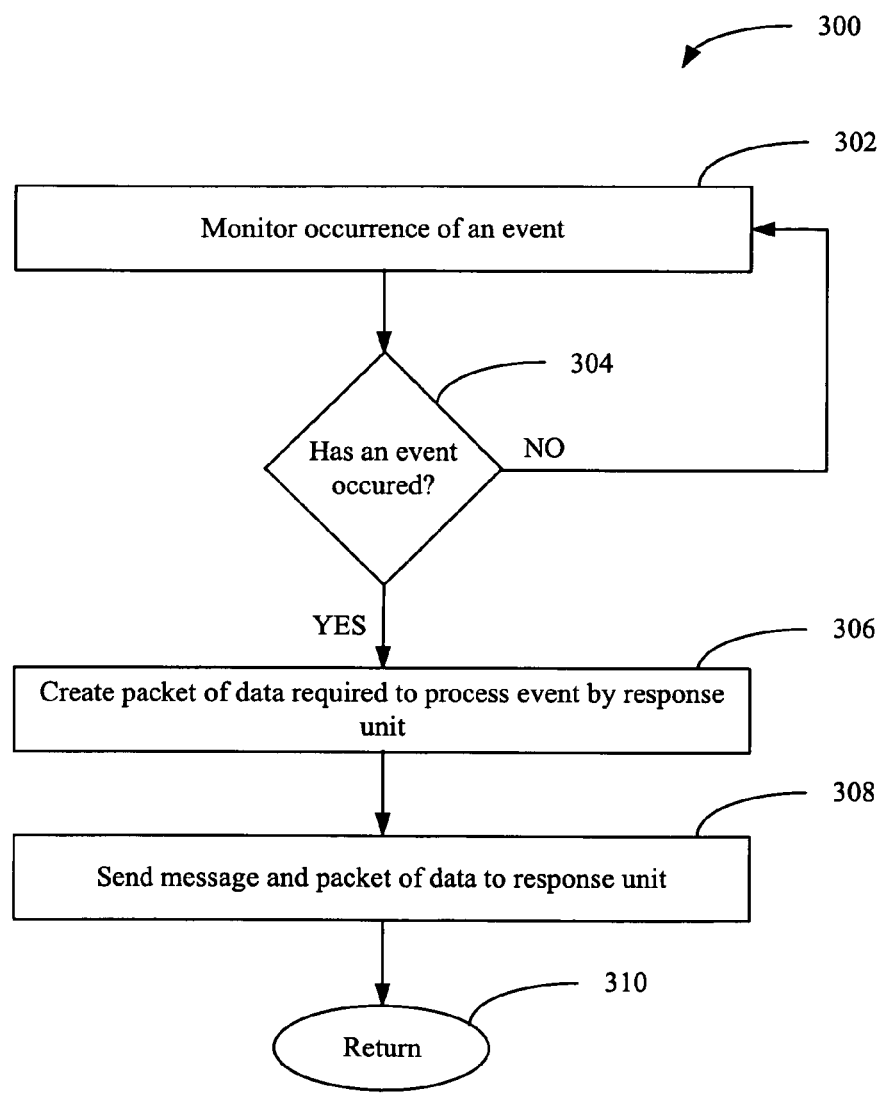
FIG. 3 is a flow chart of one example of the operation of the event processor.

A flow diagram illustrating an exemplary process 300 of the event processor is shown in FIG. 3. The process 300 may be implemented for use with the system of FIG. 1 or a different system. The process 300 begins with block 302 where the event processor monitors the system for an occurrence of an event. The event may occur directly on the GUI or from one or more computing devices, such as a keyboard, mouse, etc. The event may also occur indirectly through one or more intermediate components, which may include both hardware and software based components. The process 300 proceeds to decision block 304, where it is determined if an event has occurred on the system. If no event has occurred, the process 200 loops back to block 302. The event processor may wait in an infinite loop until an event is detected.

When the event processor detects an event, the process 300 proceeds to block 306 where the event processor creates a packet of data that contains all required information for the response unit to process the event. The process 300 proceeds to block 308 where the event processor sends a message and the packet of data to the appropriate response unit. In one example, the event processor sends the message and packet of data to the object processor to update the state of the object data structures based on the event. After sending the message and packet of data, the event processor proceeds to return block 310, where it waits for another event to occur on the system.

The object processor 108 is coupled with the event processor 106, the logic processor 112, the graphics processor 114 and is operable to communicate in memory 104. The object processor 108 creates, modifies and maintains data structures 110 that represent objects created and used in the system. The object processor 108 may create or modify data structures 110 based on instructions it receives from the event processor 106 relating to specific events performed by the user, or, as discussed below, based on instructions it receives from the logic processor 112.

The data structures 110 contain data representative of the objects and rules that define the behavior of the object at any given time. The data structures 110 are stored in memory. The data structures may be stored as dynamic files for describing and transferring data in memory 104, such as an extensible markup language ("XML"), or other formats, such as standard generalized markup language ("SGML").

The data within the data structures 110 may include information related to the object, such as the start date, end date, duration, object description, object type, object category, color, and any other data related to the object. The object processor 108 may automatically calculate object attributes based on instructions it receives from the event processor, for example, start date, end date and duration. The user may also manually enter object attributes that the object processor implements into the data structures, for example, object description, color, and resources and costs, which are discussed below.

The rules stored within the data structures 100 may include logic rules that may be based on GPM and that define how the objects may behave in the system at any given time. For example, the logic rules may govern how the objects may be shifted, crashed, or extended on the time-scaled display. The logic rules may be specific to a particular object, specific to a particular type of object, or applicable to all objects creatable by the system.

The object processor 108 may create any number of objects within the constraints of storage capacity. The object processor 108 may also create a number of object types. For example, the object processor 108 may create objects representative of activities, milestones, benchmarks, embedded nodes, logic relationships, data dates, and project ends, or project start and end dates. These objects may be classified as planning objects as they affect the logic and dependency relationships in the schedule. The object processor 108 may also create objects classified as aesthetic objects as they may be used to increase the understandability and/or aesthetic presentation of the schedule. Examples of aesthetic objects include text, annotations, which is different from text in that annotations are embedded within the object, images, resource-axis, which define the vertical axis of the resource profile graphs, and information objects, which may be used to connect to a file from an external application, for example, a user may embed a document into the schedule by storing the path of the document with the information object.

The object processor 108 maintains the state, rules and data of each of the data structures 110. The object processor 108 may communicate with the logic processor 112, which, as described below, may analyze object changes and perform calculations on objects. The object processor 108 may also communicate with the graphics processor 114, which, as described below, renders the image of the objects on the display devices based on the current state of the object at a given time.

Figure 4:
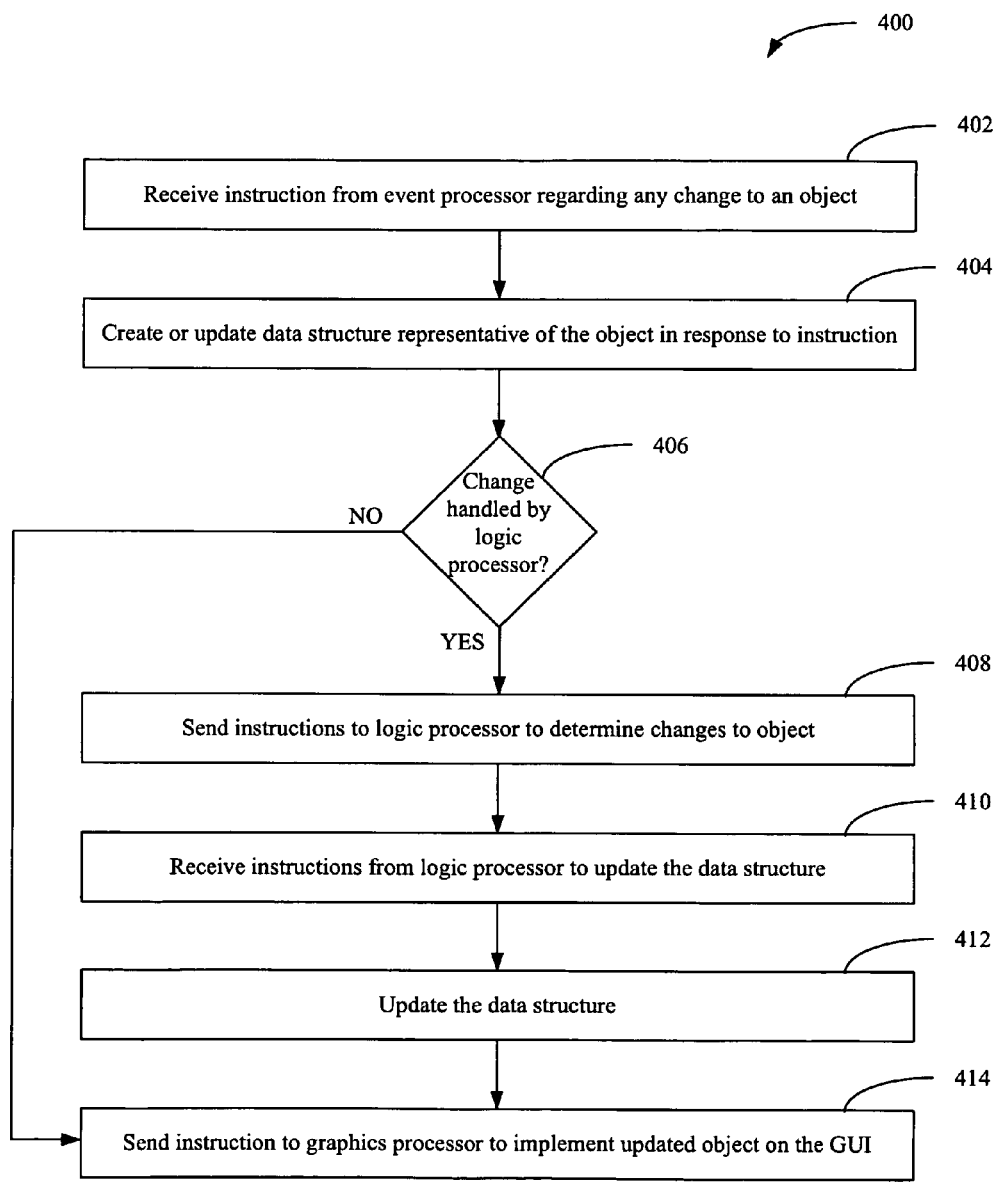
FIG. 4 is a flow chart of one example of the operation of the object processor.

A flow diagram illustrating an exemplary process 400 of the object processor is shown in FIG. 4. The process 400 may be implemented for use with the system of FIG. 1 or a different system. The process 400 begins with block 402 where the object processor receives instruction from the event processor regarding a change to an object or groups of objects. The change may include, for example, the creation of a new object, a positional change, such as a shift, extension or crash of an existing object, an object deletion, or any change to an object attribute, e.g. resource, description, color, etc.

The process 400 proceeds to block 404 where the object processor creates or updates the data structure for the object. If the object processor receives instruction from the event processor that a new object is being created, the object processor will create a new data structure to support the object. Alternatively, if the object processor receives instruction from the event processor that an existing object is being modified, the object processor will retrieve the data structure for that object and modify it accordingly.

The process 400 proceeds to decision block 406 where the object processor determines from the instructions received from the event processor if the change should be handled by the logic processor. A change that should be handled by the logic processor may include any change in which calculations may be performed on the objects, for example, a change in logic resources and/or costs. Alternatively, a change that should not be handled by the logic processor may include a change to an attribute of the objects, such as color, description or other attribute change that does not require a calculation to be performed on the objects.

If the object processor determines the change should not be handled by the logic processor, the process 400 branches to block 414 where the object processor sends instructions to the graphics processor to implement the updated object on the GUI. As explained below, the object processor sends to the graphics processor the current state of the data structures for the modified objects and the graphics processor converts the data into pixel information to render the display on the GUI.

Alternatively, if the object processor determines from the instructions that the change should be handled by the logic processor, the process 400 proceeds to block 408 where the object processor sends instructions to the logic processor to determine the changes to the object. The process 400 proceeds to block 410 where the object processor receives instructions from the logic processor to update the data structure for the object. As explained below, the logic processor may apply one or more calculations on the objects, and may send instructions back to the object processor including how to modify the object in response to the result to the calculations. The process 400 proceeds to block 412 where the object processor updates the data structure and stores the updated data structure in memory. The process 400 proceeds to block 414 where the object processor sends instructions to the graphics processor to implement the updated object on the GUI.

The logic processor 112 is coupled with the object processor 108 and is operable to communicate in memory 104. The logic processor 112 applies calculations on the objects. The calculations may be based on the information received from the object processor 108. The calculations may include healing algorithms, discussed below; float, drift and/or gap calculations; shifting successor and/or predecessor activities and milestones; resource and costs calculations; constraint enforcement calculations on activities and milestones; and other calculations that may be applied to the object or group of objects in response to instructions received from the object processor 108. The logic processor 112 creates a log of all the modifications to apply to the objects in response to the calculations applied, and passes the log to the object processor 108, which updates the data structures corresponding to the objects according to the log.

Figure 5:
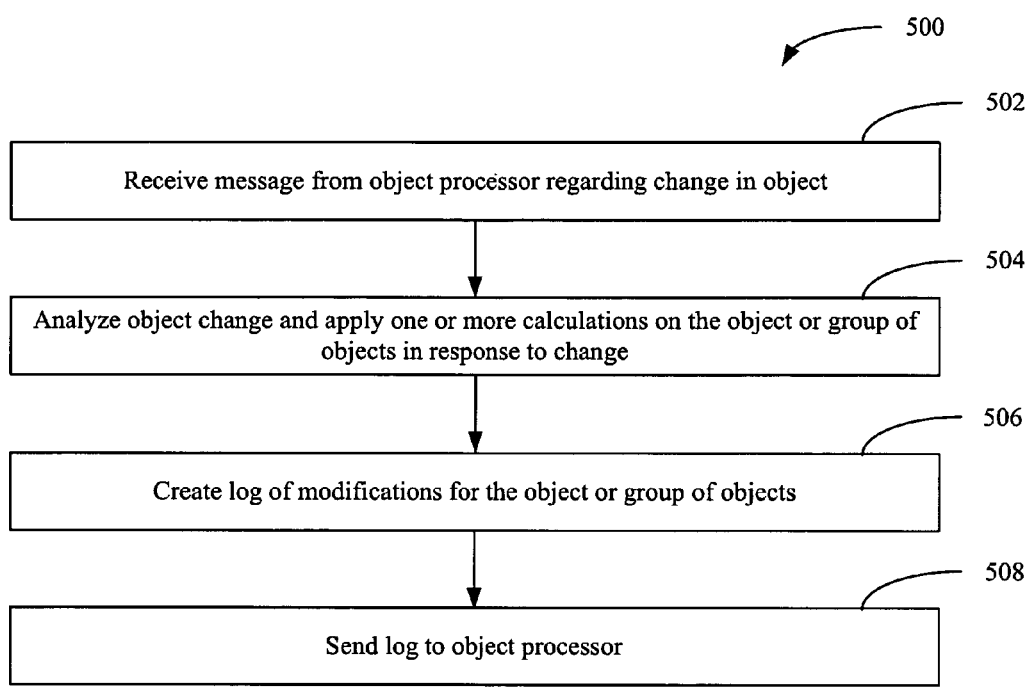
FIG. 5 is a flow chart of one example of the operation of the logic processor.

A flow diagram illustrating an exemplary process 500 of the logic processor is shown in FIG. 5. The process 500 may be implemented for use with the system of FIG. 1 or a different system. The process 500 begins with block 502 where the logic processor receives a message from the object processor regarding a change in an object that requires a calculation to be performed on the object. Process 500 proceeds to block 504 where the logic processor analyzes the object change and applies one or more calculations on the object or a group of objects to maintain the GPM rules with respect to the object or group of objects. For example, the object processor may send a message to the logic processor containing an object change representative of a shift to an activity. The logic processor may shift and/or calculate gap, float and drift values for predecessor and successor objects in response to the object change, in order to ensure that GPM rules are maintained.

The process 500 proceeds to block 506 where the logic processor creates a log of the modifications that were applied to the object or group of objects. The logic processor records each modification that the object processor will need to update the state of the object or objects after the calculations have been applied. The process 500 proceeds to block 508 where the logic processor sends the log of information to the object processor. The object processor updates the data structures for each modified object based on the log data, and stores the updated data structures in memory. As described below, the object processor sends to the graphics processor the updated state of the objects and the graphics processor converts the data contained in the data structures into a displayable image on the GUI.

An exemplary operation that may be applied by the logic processor in response to an object change is a healing algorithm. The healing algorithm may "heal" an infeasible or corrupt plan, or a plan that violates one or more logic rules for planned dates and gaps. The ability to heal a plan in real-time, without having to send instructions in serial to a stand-by scheduling engine, provides a cognitively responsive environment as users experiment with "what-if" scenarios, for example, what happens if an activity is crashed in an effort to save costs on the project.

Figure 6:
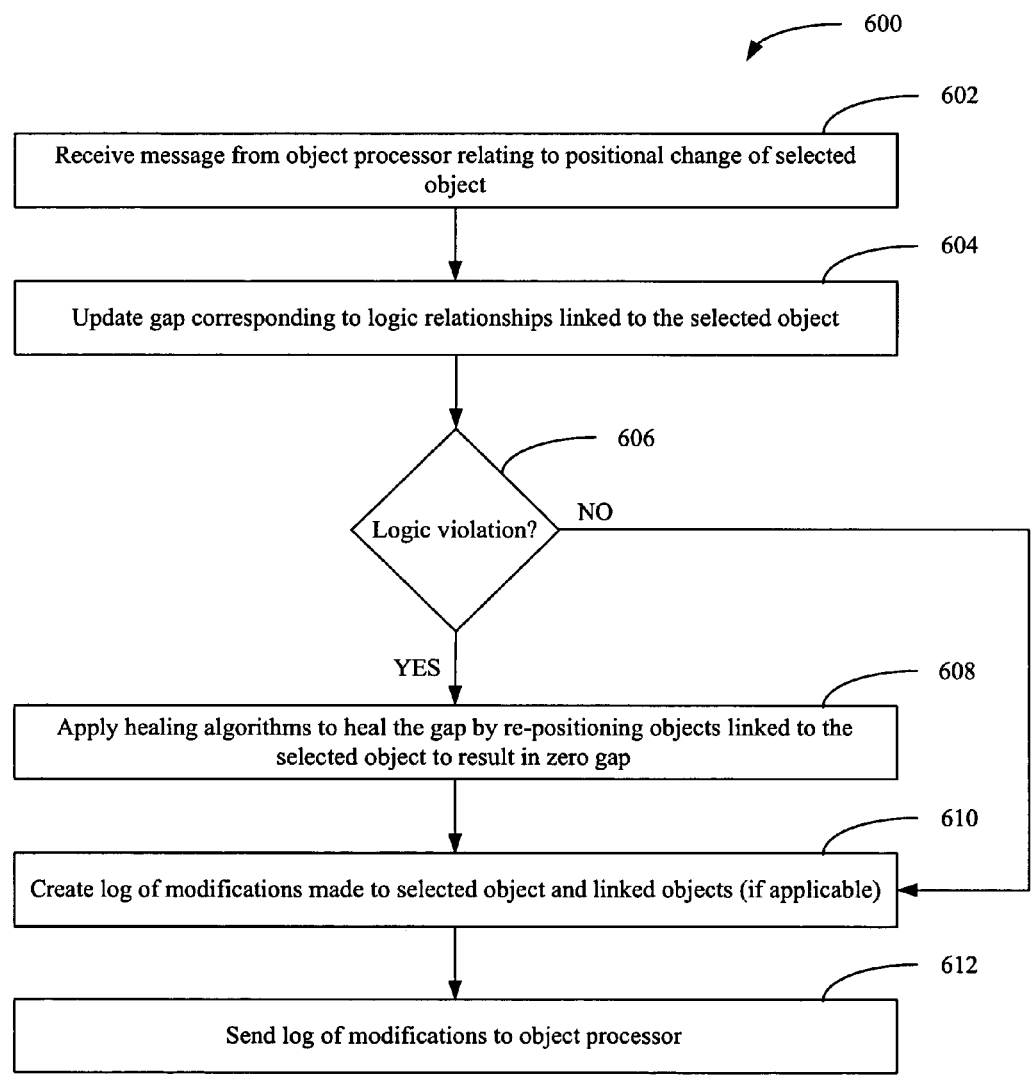
FIG. 6 is a flow chart of one example of the healing algorithm of the logic processor.

A flow diagram illustrating an exemplary process for healing a schedule is shown in FIG. 6. The process 600 may be implemented for use with the system in FIG. 1 or a different system. The process 600 begins with block 602 where the logic processor receives a message from the object processor relating to a positional change of a selected object. The process 600 proceeds to block 604 where the logic processor calculates the updated gap corresponding to logic relationships linked to the selected object, in response to the positional change. The process 600 proceeds to decision block 606 where it is determined if any of the updated gaps violate logic. A logic violation occurs, as pertinent to this example, where the calculated gap is negative. If none of the gaps violate logic, then the process 600 proceeds to block 610 where the logic processor creates a log of modifications made to the selected object based on the positional change. If no logic violation is calculated, the linked objects may not be modified and may not be part of the log data.

Alternatively, if a logic violation occurs, the process 600 proceeds to block 608 where the logic processor applies healing algorithms to heal the gap by re-positioning, e.g. push in the forward direction or backslide in the backward direction, the objects linked to the selected object until the gap is healed, or the gap calculation equals to at least zero. The process 600 proceeds to 610 where the logic processor creates a log of modifications made to the selected object and linked objects based on the positional changes made to the objects. The process 600 proceeds to block 612 where the logic processor sends the log data to the object processor, which may update the data structures for the modified objects according to the log data.

Moreover, in circumstances where a logic violation occurs, the logic processor may prompt the user to determine if the user desires to violate logic. If the user desires to violate logic, the logic processor may not apply healing algorithms to heal a negative gap. Instead, the logic processor may allow the logic violation and the user may re-position one or more objects on the time-scaled display without the logic processor pushing or backsliding activities in real-time to maintain logic. This feature may be useful when an activity has reached critical point and cannot be pushed (or backslid) without forcing a later completion date (or earlier start date) of the project.

Figure 7:
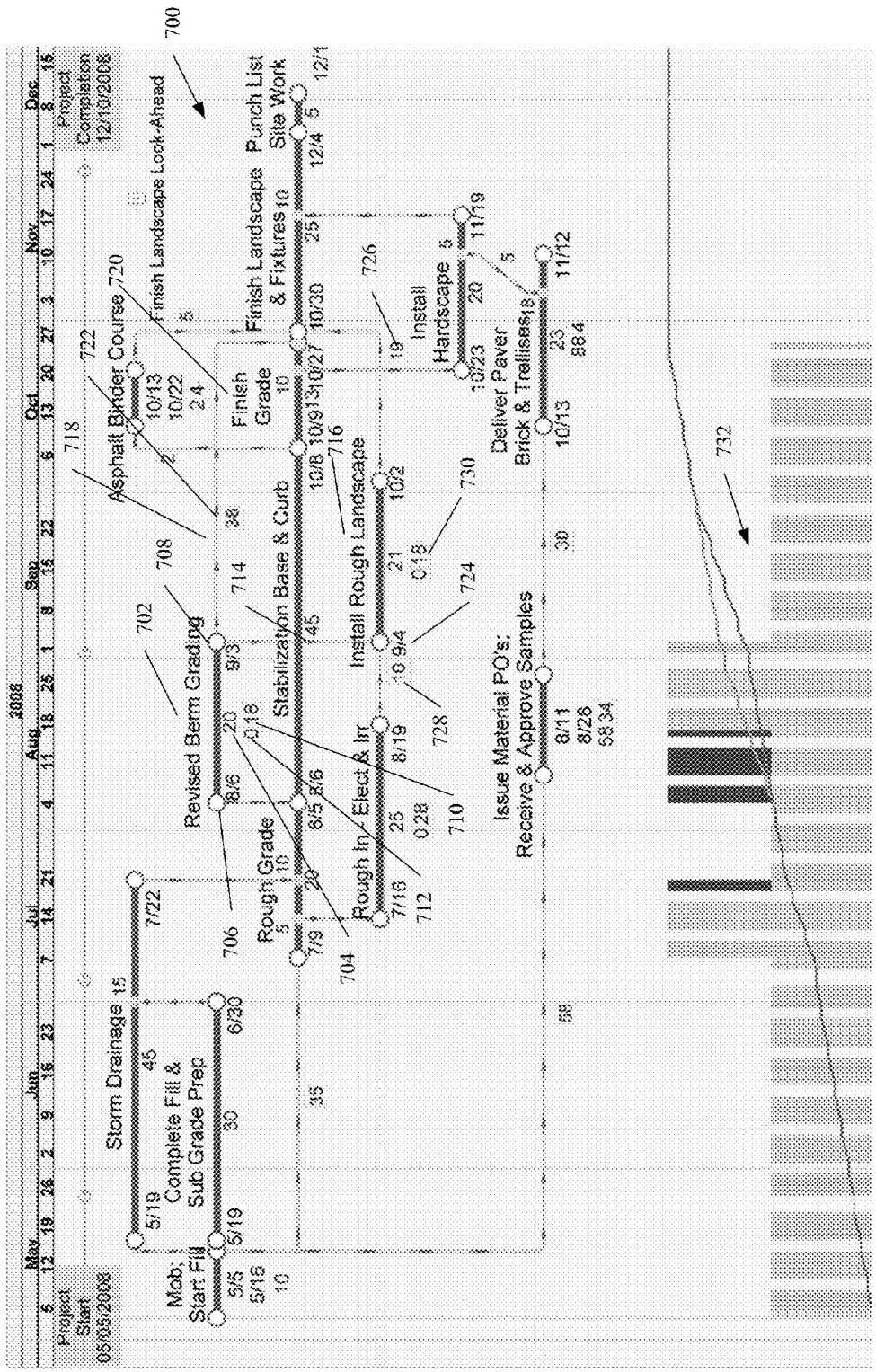
FIG. 7 is an exemplary project schedule.
Figure 8:
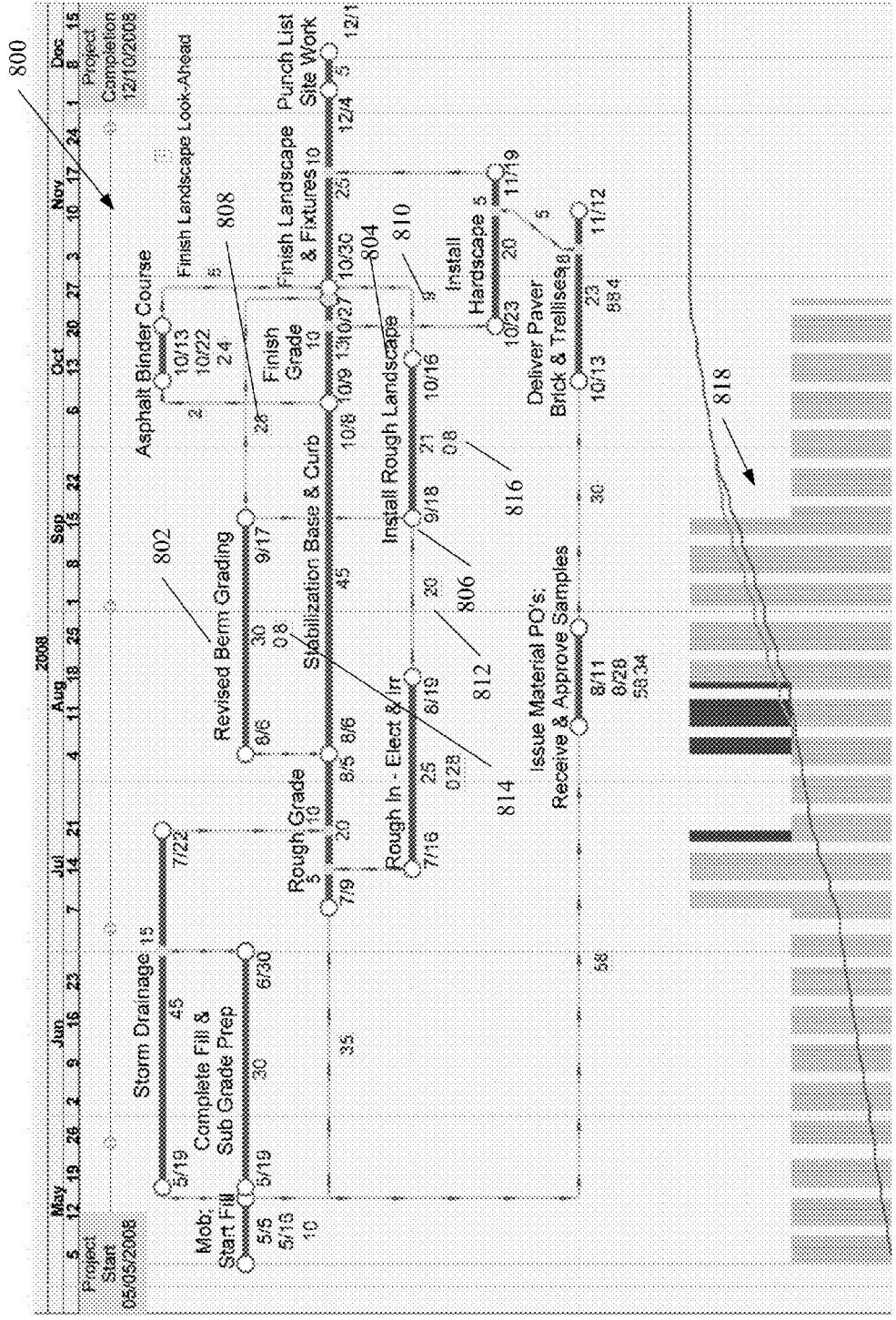
FIG. 8 is an exemplary project schedule.

FIGS. 7 and 8 show exemplary project schedules, which may be used to illustrate how the logic processor may apply the healing algorithms to heal a corrupted plan. As shown in FIG. 7, the activity 702 (entitled "Revised Berm Grading" in this example) has a duration of twenty calendar days 704, configured from its start date, represented by node 706 (Aug. 6, 2008 in this example) and its end date, represented by node 708 (Sep. 3, 2008 in this example). The activity 702 has a float 710 equal to eighteen working days in this example. Accordingly, activity 702 may be slipped by eighteen working days before the schedule completion date must be extended. Moreover, the activity 702 has a drift 712 equal to zero in this example. Accordingly, the activity 702 cannot backslide without forcing an early start project start date, as activity 702 is deemed to be in a critical path.

The activity 702 has two successor logic relationships. The first logic relationship is a finish-to-start ("FS") logic relationship 714 with activity 716 (entitled "Install Rough Landscape" in this example). The FS logic relationship 714 has a zero gap in this example. The second logic relationship is a finish-to-finish ("FF") logic relationship 718 with activity 720 (entitled "Finish Grade" in this example). The FF logic relationship 718 is embedded with a thirty-eight working day gap 722, meaning that predecessor activity 702 may slide beyond its position or extend by thirty-eight working days before the position of the successor activity 720 is delayed. Moreover, the activity 716 has a start date, represented by node 724 (Sep. 4, 2008 in this example), and an eighteen working day float 730. Moreover, the schedule 700 shows a ten working day gap 728 and a nineteen day working day gap 726. There is also display a resource histogram 732.

FIG. 8 shows the schedule 700 as depicted in FIG. 7, but the duration of activity 702 has been extended by ten working days. Normally, extending activity 702 would violate the FS logic relationship 714 as it would result in a "negative" gap. However, the logic processor, in combination with other components of the system, may heal the schedule 800 to display the effects in real-time of extending activity 702 (designated as 802 in FIG. 8). For example, the logic processor may push the start of activity 804 by ten working days so that that the FS logic relationship maintains its zero gap; compare node 724 (representing date Sep. 4, 2008 in this example) with node 806 (representing Sep. 18, 2008 in this example).

Moreover, the logic processor may update all gaps in real-time that are linked to activity 802. In this example, the gaps 808 and 810 were decreased by ten working days (compare with gaps 722 and 726 shown on FIG. 7), whereas the gap 812 was increased by ten working days (compare with gap 728 shown in FIG. 7). The logic processor may also update all floats in real-time that are affected by the extension of activity 802. In this example, the floats 814 and 816 were decreased by ten working days (compare with floats 710 and 730 shown in FIG. 7). The logic processor may also update the resources attributable to the activities that were affected by the modification, which is discussed below. For example, compare the resource histogram 818 in FIG. 8 with the histogram 732 in FIG. 7.

As described, once an activity or other planning object is positioned or re-positioned on the time-scaled display, the system calculates and displays to the user the floats, drifts and gaps in the plan without having to resort to traditional scheduling engines and batch processing techniques. The system may update the calculations and graphical representations in the schedule concurrently and in real-time to give the user immediate feedback of the effects of any modification. The user is therefore able to test any given "what-if" scenario to better plan and optimize the schedule. In this respect, the system is a networking process of one-step flow, instead of a flow consisting of a series of batches.

Referring back to FIG. 1, the graphics processor 114 is coupled with the object processor 108 and the GUI 102 and is operable to communicate in memory 104. The graphics processor 114 formulates and displays the image on the GUI. The graphics processor 114 may receive instructions from the object processor 108. The instructions may contain up-to-date data structures, or portions thereof, of objects that are to be displayed. The graphics processor 114 processes the object data and creates an image in memory 104 containing representations of all objects passed from the object processor. The image in memory 104 may be used to format each pixel on the display so that each object is rendered on the display. The image may be passed to the GUI, or other graphical device, to be displayed to the user.

Figure 9:
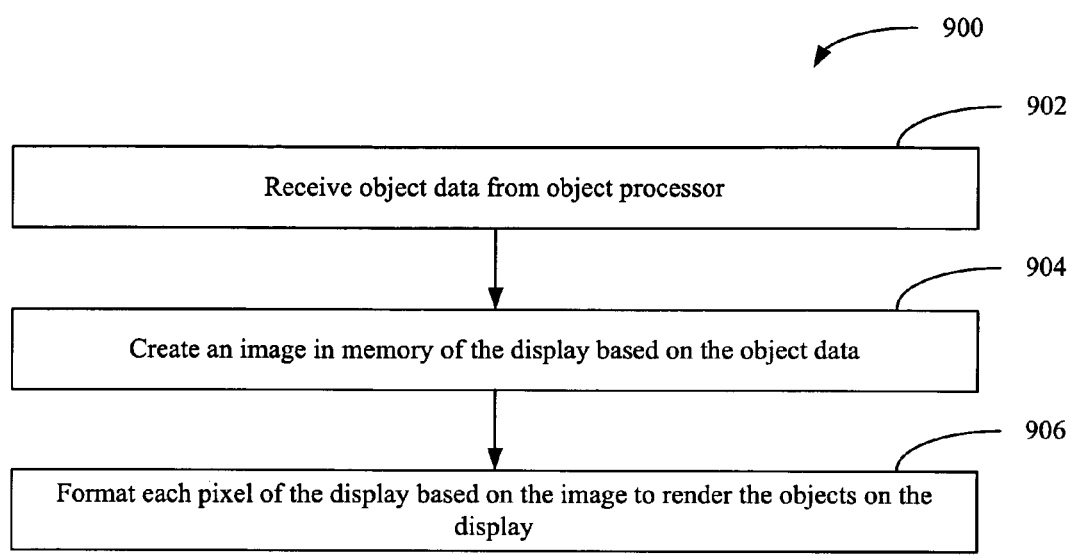
FIG. 9 is a flow chart of one example of the operation of the graphics processor.

A flow diagram illustrating an exemplary process 900 of the graphics processor is shown in FIG. 9. The process 900 may be implemented for use with the system of FIG. 1 or a different system. The process 900 begins with block 902 where the graphics processor receives object data from the object processor. The object data may be in the form of data structures representing the most recent state of the objects to be displayed. The process 900 proceeds to block 904 where the graphics processor creates an image in memory of the display based on the object data. The image in memory may contain representations of all objects that are to be displayed. The process 900 proceeds to block 906 where the graphics processor formats each pixel on the display based on the image in memory to render the objects on the display. The display may then be shown on a GUI, or other graphical device used by the system.

It will be appreciated that the system may be used in a variety of applications. For example, as mentioned above, the system may be used to optimize schedule as to resources and costs for a project or group of projects. The system may provide real-time feedback on the impact of resources and costs as the user manipulates the project schedule. Accordingly, optimization of resources and costs occurs interactively. The system may also allow a user to dynamically extend and crash and slide or backslide a schedule to optimize resources and costs for a project.

The system may provide project resources based on a number of predefined characteristics. These characteristics may include resource type, category, cost, and color, color shading and/or hatching pattern to be assigned to the resource for display. The resource type may be user definable. Examples of resource type in the construction industry include carpenter, backhoe, concrete, etc. Other resource types in other industries may be defined by the user. The user may include any level of specificity in defining resource types. For example, the user may define a carpenter with specific training, a backhoe with specific lift capacity, and specific grade of concrete, etc. The system may also provide a listing of resource types for the user to select, which may be divided at any level of granularity and may be categorized based on industry.

The system may also provide the user with a list of resource categories for the user to select, e.g. labor, equipment, material, commodity, professional, etc. For example, carpenter may fall under the category "labor," backhoe may fall under the category "equipment," and concrete may fall under the category "material." The system may offer any number of resource categories for the user to select and associate with the resource type. The user may also customize resource categories. The system may also provide the user with a palette of colors to select to associate with the resources. The system may also provide the user with a selection of hatching patterns to associate with the resources.

Resources may be assigned or associated with activities as the activities are added and/or modified on the time-scaled display. The user may assign resources globally to all activities through a common interface or to each activity individually. The user may also update and/or modify the resource assignments at any time. For example, the user may select an activity and assign one or more resources to the activity. The user may also assign a resource consumption rate to the activity that is based on a unit of time. The user may provide a daily consumption rate or a total consumption rate based on the duration of the activity. For example, if a selected activity has a duration of five days and it will require two carpenters per day to complete, the user may enter a daily-rate of two, or a total-rate of ten for the carpenter resource. The system may calculate the daily-rate based on the total-rate and vice-versa.

The resource consumption for a given period of time may be calculated as the sum of all consumption rates for all activities consuming the resource during the period of time. The system may calculate the resource consumption for each resource and may graphically represent the resource consumption on the GUI. The resource consumption may be designated as $R_i$, where $R_i$ denotes the daily-rate for activity "I". The system calculates $R_i$ for all activities and graphically represents the selected activities on the GUI.

The system may also calculate the total cost for an activity, group of activities, resource type, resource category and/or a total cost for the project based on cost data entered by the user. The user may assign a cost to each resource. The cost may be entered as a daily-rate, which refers to the cost of the resource per day, or a total-rate, which refers to the cost of the resource to complete the activity. The total-rate cost may be independent of the activity's duration. The system may calculate the total cost for an activity, group of activities, resource type, resource category and/or a total cost for the project and graphically represent the cost data on the GUI. The user may utilize the cost data to effectively shorten or extend the schedule, or make other modifications to the schedule to optimize costs. The system may employ all gaps for assessing the effect on the entire network of variations in an activity or group of activities targeted for crashing, extending, sliding or backsliding for the purpose of earlier or extended project completion.

Figure 10:
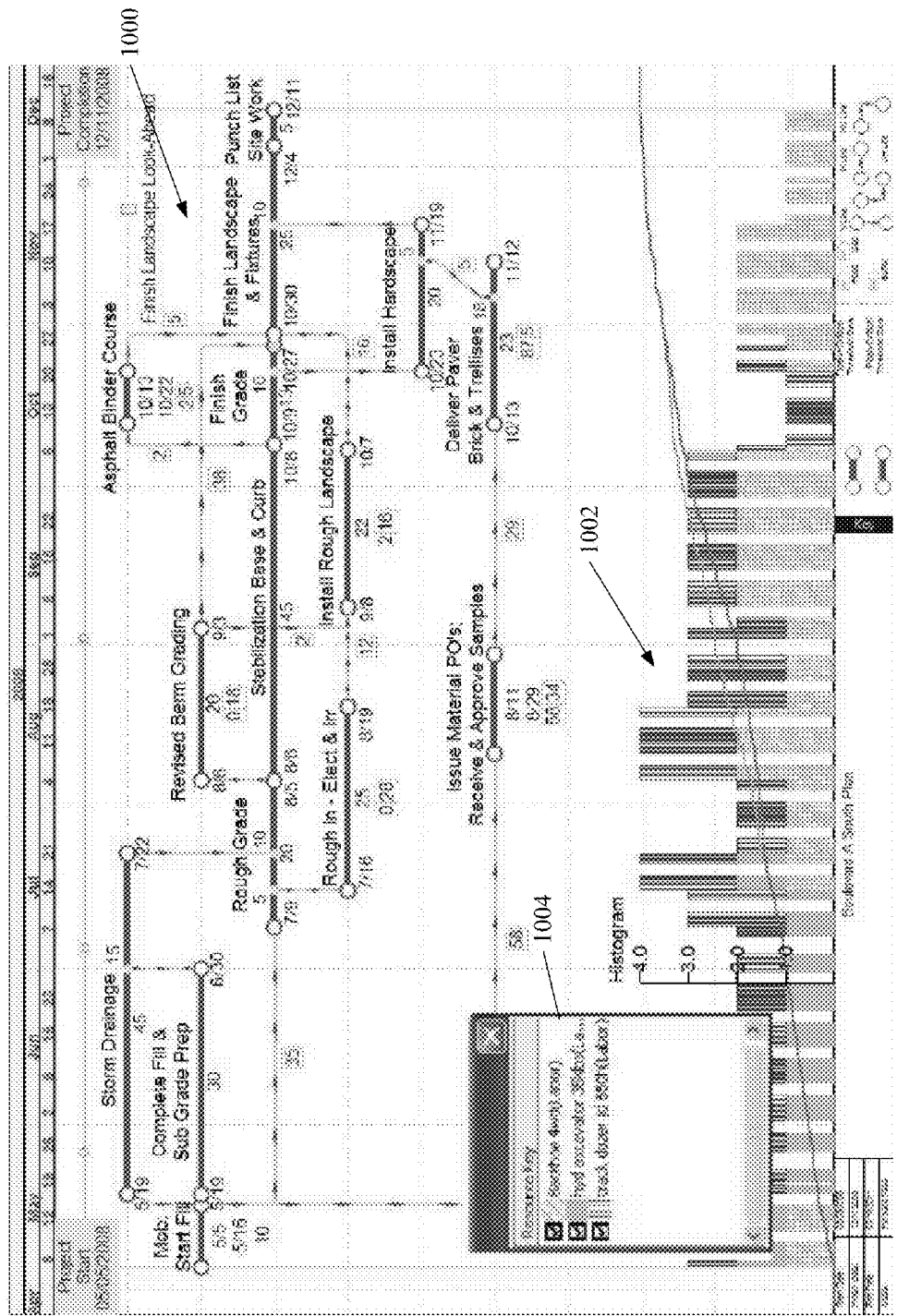
FIG. 10 is an exemplary project schedule.
Figure 11:
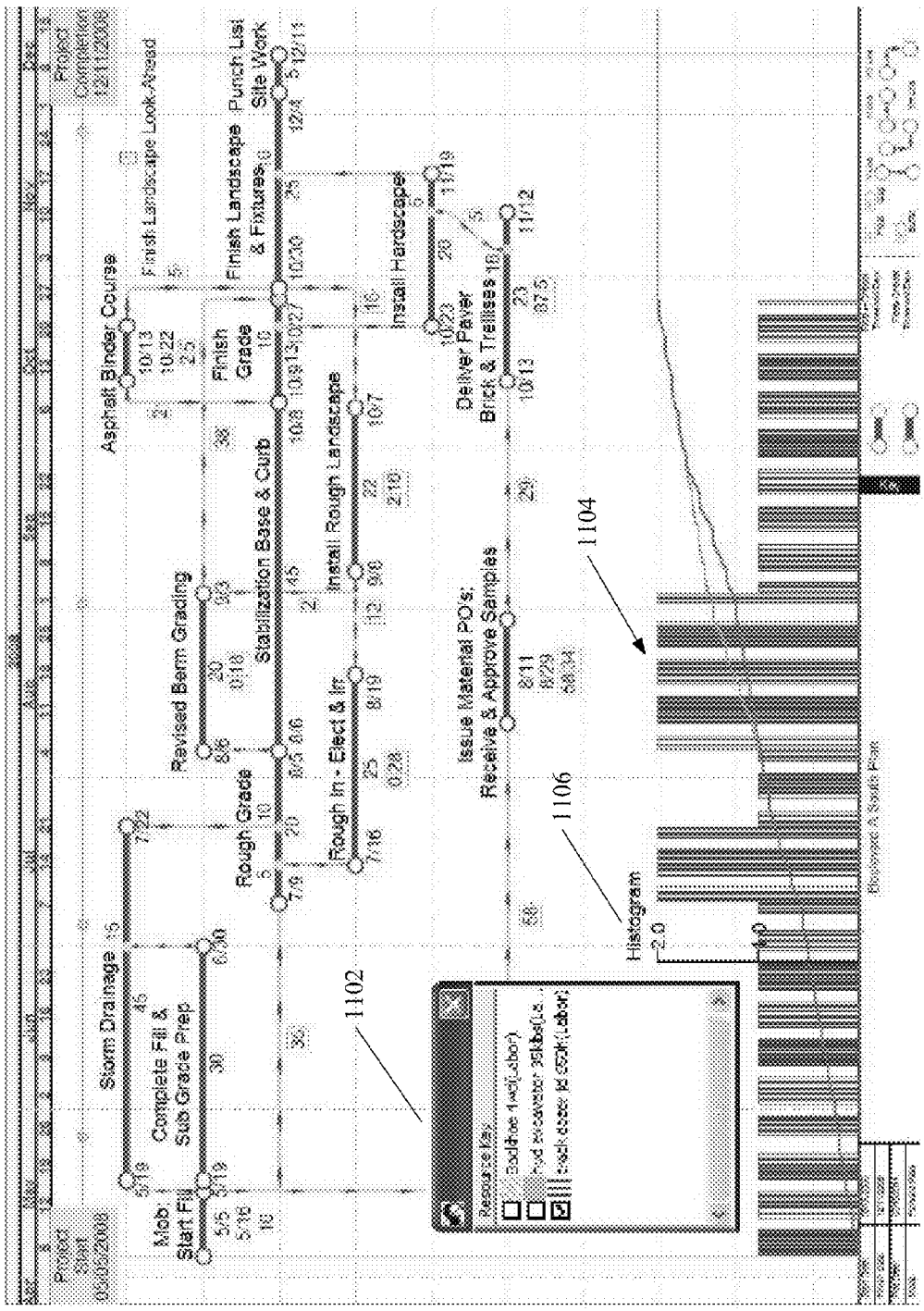
FIG. 11 is an exemplary project schedule.

FIG. 10 shows an exemplary project schedule 1000 with resource consumptions displayed in histogram display 1002. As shown, the resource consumptions in the histogram 1002 are distinguished by user defined colors, shades and/or hatching patters. The histogram 1002 represents the daily resource consumption, but other time periods may be used, e.g. weekly, monthly, quarterly, yearly, etc. A resource key 1004 shows the resources that are selected to be displayed in the histogram 1002. The selected resources include backhoe, hydraulic excavator and track dozer. The resource key 1004 enables a user to turn on and off any of the resources listed in the key 1004. For example, in FIG. 11, the user has selected to display only the resource consumption for track dozer, as evidenced by the resource key 1102 and histogram 1104. A resource axis 1106 is provided to determine the number of track dozer units required for the specified day.

The system may provide alternative graphical representations of resources, including baseline, early dates, and late dates. Baseline represents the total consumption of resources at a point in time. Baseline may be calculated as $RES_n = RES_{n-1} + R_i$, where "n" denotes every day between the planned dates for activity "I" and $R_i$ denotes the resource daily-rate for activity "I". "Early dates" represents the total resource needs for a calendar period where the reverse float has been removed from all activities. Alternatively, "late dates" represents the total resource needs for a calendar period where the forward float has been removed from all activities. These resource representations for baseline, "early dates" and "late dates" may be in the form of a line graph and overlaid on the resource consumption histogram, although other graphical representations may be used.

The system may update the calculations and graphical representations of the resource consumptions in real-time in response to position changes, additions, deletions, and/or other modifications made to the activities and/or logic relationships. The system provides the unique functionality of continuously displaying the evolving resource and/or cost profiles in response to modifications made to the position and/or resource profiles of activities. In one example, if the evolving resource profile starts to trend unfavorably as activities are positioned or reposition, the trend may be reversed by repositioning the activity to a position that resolves the impasse. Accordingly, the system allows for efficient resource leveling as activities and logic relationships are established and/or modified.

Figure 12:
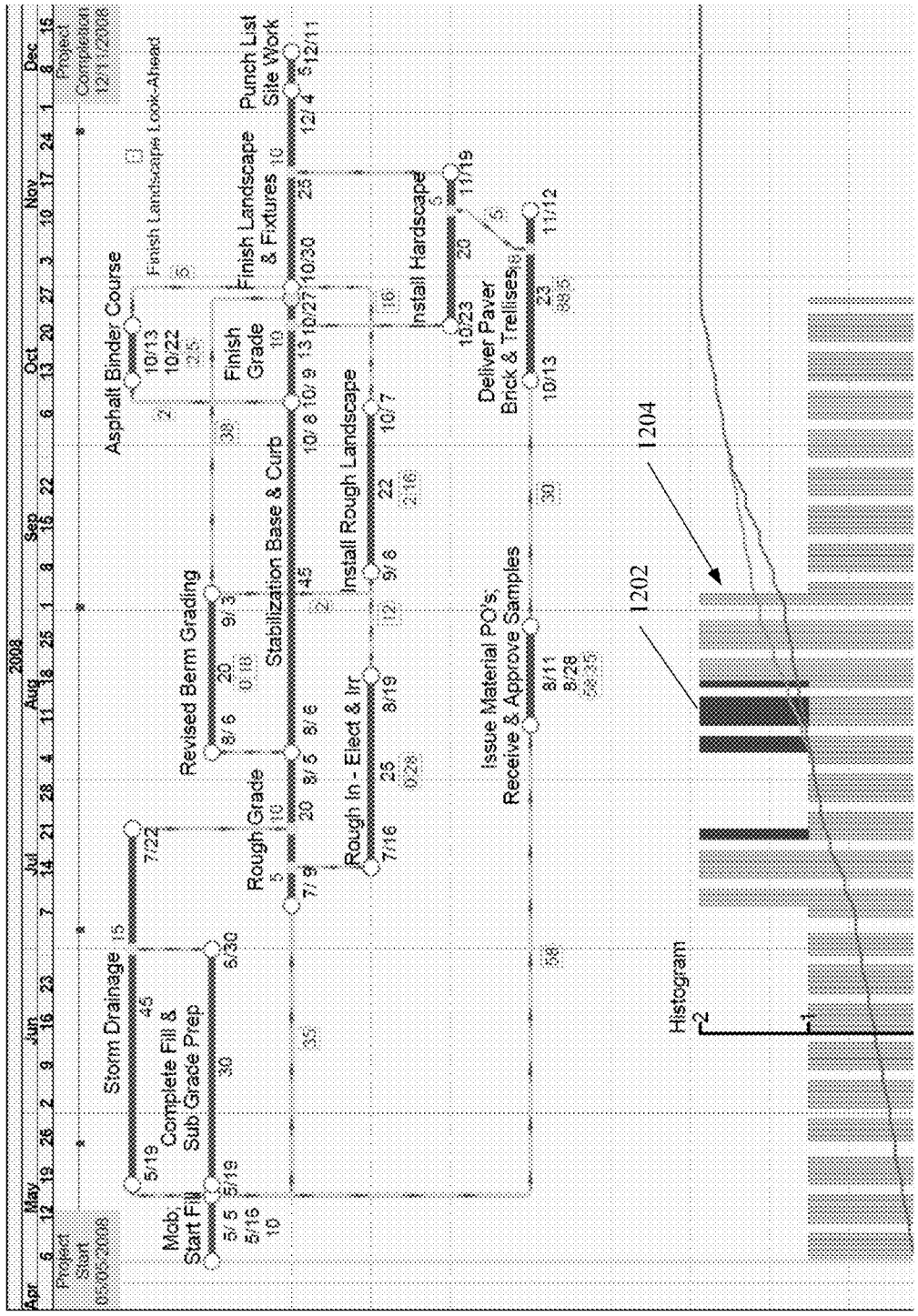
FIG. 12 is an exemplary project schedule.

To facilitate resource leveling, the system may allow a user to set one or more resource consumption limits for given activities during a specified period of time. The system may also allow a user to set one or more cost limits. The system allows the user to toggle the limits on and off. The system may provide immediate feedback information if a resource or cost exceeds an established limit. The system enables the management of complex resource allocations and cost data that could not otherwise be handled in an efficient and practical manner. For example, a project manager may have only one track dozer available for the period between Jul. 21, 2008 and Aug. 18, 2008. The project manager may set a resource limit for track dozers to one unit, or one track dozer per day, during this time period. If the resource consumption exceeds the limit, the system may alert the user of the resource overrun. For example, in FIG. 12, the schedule exceeds the resource limit for track dozers during this time period, as represented by designation 1202. In this example, the system alerts the user by changing the overrun portion 1202 of the histogram 1204 to red, although other colors or graphical alerts may be used.

The system may also facilitate resource leveling by displaying or activating only those activities that contain the resource that is being leveled. The system may highlight or graphically distinguish the activities that contain the resource to allow the activities to be viewed in connection with the resource histogram. The ability to level one resource at a time may increase resource leveling efficiency. It also allows stakeholders interested in only a few resources to filter out the activities and/or resources that they are not concerned with.

The system may also allow resource leveling to be performed simultaneously on more than one project. For example, if a user has multiple projects overlapping in time, the user may import the projects onto one time-scaled display to optimize resources and/or costs across all projects. The user may distinguish between the projects by shading or other graphical means, for example, color, pattern, etc. The system may calculate the resource consumption for all activities across the projects and graphically represent the resource consumptions. The system may update the calculations and graphical representations in response to modifications made to the activities across all projects.

Examples of sequence of steps and alternatives for leveling a resource with a set resource limit include:

Push/slide or pull/backslide other activities not consuming the resource to be leveled to increase as much as possible gaps for activities consuming the resource being leveled;

Slide (backslide) activities consuming the resource being leveled that have only positive gaps to their respective successors (or predecessors) to improve the histogram or eliminate a resource limit overrun;

Slide (backslide) activities consuming the resource being leveled that have positive float (drift), even if connected to successors (from predecessors) via zero gap links as the system causes the affected fragments originating from or ending on the activity at issue to shift accordingly;

Split activities into a predecessor and successor relationship to create a gap and allow for more flexibility and placement of the activities;

Slide (backslide) the segments to improve the resource profile or eliminate a resource limit overrun;

Crash or extend activities to improve the resource profile or eliminate a resource limit overrun;

Restate finish-to-start logic, where appropriate as start-to-start or finish-to-finish logic, thereby increasing gaps and creating additional leveling alternatives; and Crash or extend other activities not consuming the resource being leveled thereby increasing gaps and creating additional leveling alternatives.

Figure 13:
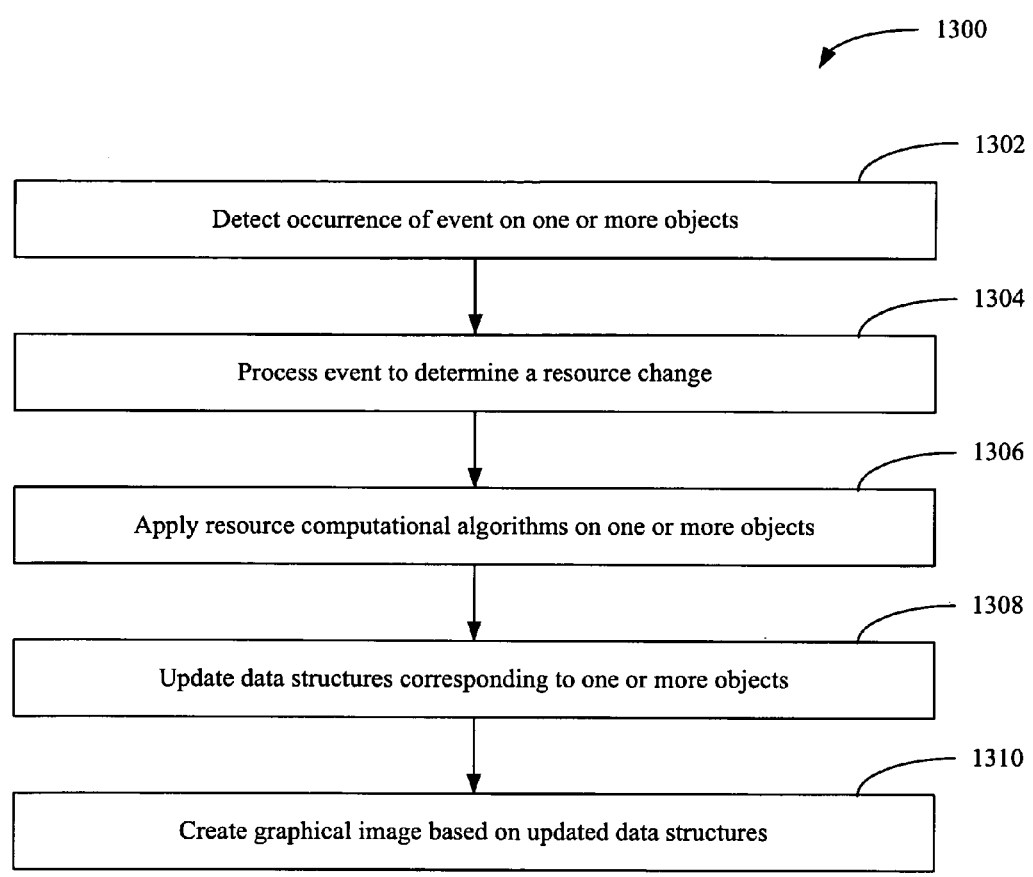
FIG. 13 is a flow chart of one example of optimizing resources by the system.

A flow diagram illustrating an exemplary process for optimizing resources for a project is shown in FIG. 13. The process 1300 may be implemented for use with the system in FIG. 1 or a different system. The process 1300 begins with block 1302 where the event processor detects the occurrence of an event applied to one or more objects. The process 1300 proceeds to block 1304 where the object processor processes the event to determine that the event represents a modification in resources to the one or more objects. The modification of resources may include an addition or deletion of an activity assigned one or more resources; an addition of a resource added to the schedule and assigned to one or more activities; a deletion of a resource of an activity; a positional change made to an existing object that is assigned one or more resources; a change in resource type, category, or resource consumption rate assigned to an object; or a modification to the graphical representation of the resources. Other resource modifications may be recognized by the object processor. The object processor passes instructions to the logic processor to apply resource computational algorithms to the one or more objects.

The process 1300 proceeds to block 1306 where the logic processor applies resource computational algorithms to the one or more objects to compute the consumption values for each resource assigned to the one or more objects. The logic processor may also compare the consumption values with any resource limits set by the user to determine if there is overage. The logic processor creates a data log of the calculated resource consumptions, and any overage information, and passes the data log to the object processor. The process 1300 proceeds to block 1308 where the object processor updates the data structures corresponding to the one or more objects based on the data log created by the logic processor. The object processor stores the updated data structures in memory. The process 1300 proceeds to block 1310 where the graphics processor creates a graphical image based on the updated data structures. The graphical image represents the updated resource profile resulting from the event. The graphical image is produced in real-time to allow the user to effectively and efficiently level one or more resources by experimenting with "what if" scenarios on the time-scaled display.

Figure 14:
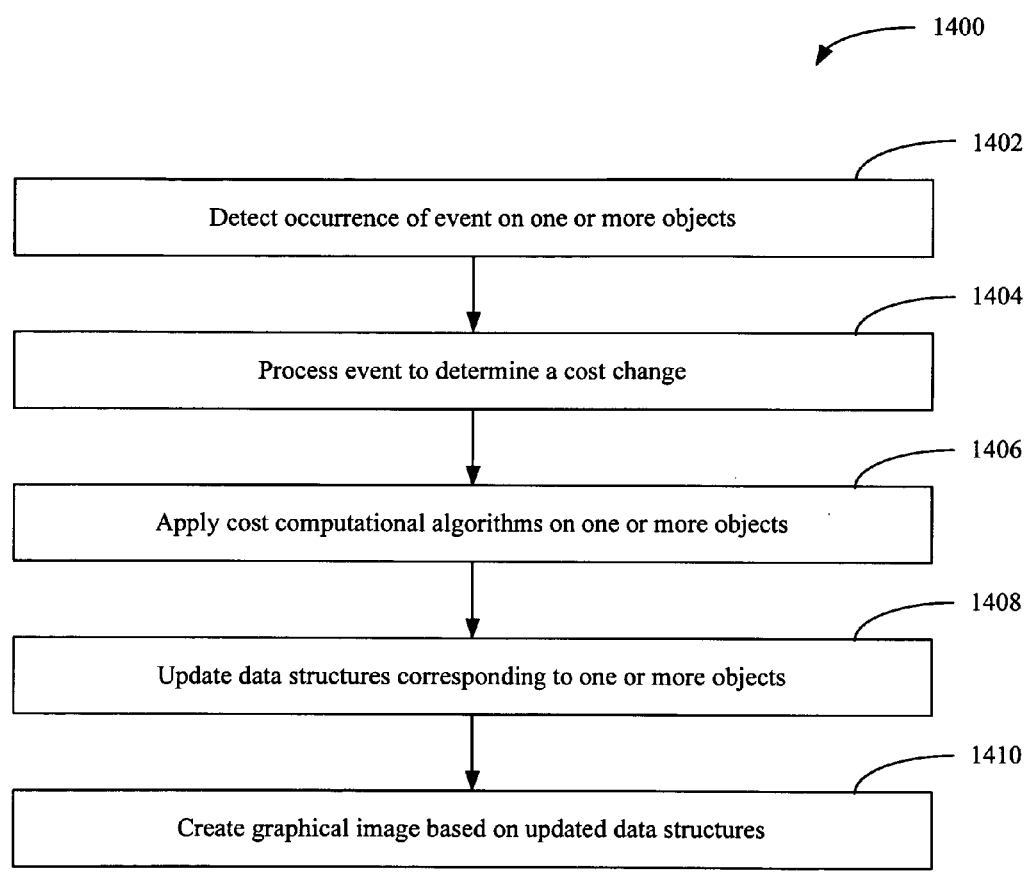
FIG. 14 is a flow chart of one example of optimizing costs by the system.

A flow diagram illustrating an exemplary process for optimizing costs of a project is shown in FIG. 14. The process 1400 may be implemented for use with the system in FIG. 1 or a different system. The process 1400 begins with block 1402 where the event processor detects the occurrence of an event applied to one or more objects. The process 1400 proceeds to block 1404 where the object processor processes the event to determine that the event represents a modification in costs to the one or more objects. The modification of costs may include an addition or deletion of an activity assigned cost data; additional cost data added to the schedule and assigned to a particular resource of an activity; a deletion of cost data; a positional change made to an existing object that is assigned cost data; a change in resource consumption rate or cost rate; or a modification to the graphical representation of the cost data. Other cost modifications may be recognized by the object processor. The object processor passes instructions to the logic processor to apply cost computational algorithms to the one or more objects.

The process 1400 proceeds to block 1406 where the logic processor applies cost computational algorithms to the one or more objects to compute cost values of the project. The cost values may include the total cost for an activity or group of activities, resource type or group of resource types, resource category or group of resource categories, total cost for a project or group of projects, or any combination thereof. Other cost information may be calculated by the logic processor. The logic processor may also compare the cost values to any cost limits set by the user to determine if there is overage. The logic processor creates a data log of the calculated cost values, and any overage information, and passes the data log to the object processor.

The process 1400 proceeds to block 1408 where the object processor updates the data structures corresponding to the one or more objects based on the data log created by the logic processor. The object processor stores the updated data structures in memory. The process 1400 proceeds to block 1410 where the graphics processor creates a graphical image based on the updated data structures. The graphical image represents the updated cost values resulting from the event. The graphical image is produced in real-time to allow the user to effectively and efficiently shorten or extend schedules, or make other modifications to the schedule to optimize costs.

The system may also allow for backward planning a schedule by diagramming activities and relationships originating from a known completion date, also known as back-building activities. There are many projects where the completion is known, e.g. completion of a school in time for fall opening, and the goal of the planning and scheduling process is to assist stakeholders in determining an optimal starting date, which may not necessarily be the earliest starting date. The system provides for such backward-pass activity definition, sequencing and dating.

Utilizing the system, planned start and finish dates flow naturally when activities are assigned durations and sequenced on the time-scaled display. Knowing planned dates of activities as they are being defined and sequenced allows the system to re-plan the flow of the schedule spontaneously, relying on the object-oriented design of the system. For example, knowing planned dates for weather-sensitive activities allows their durations to be estimated correspondingly. With the time-scaled display in full view, planning, at any time, can move on to a completely unrelated set of activities, logic, milestones and benchmarks, and then eventually resume on prior activities.

Figure 15:
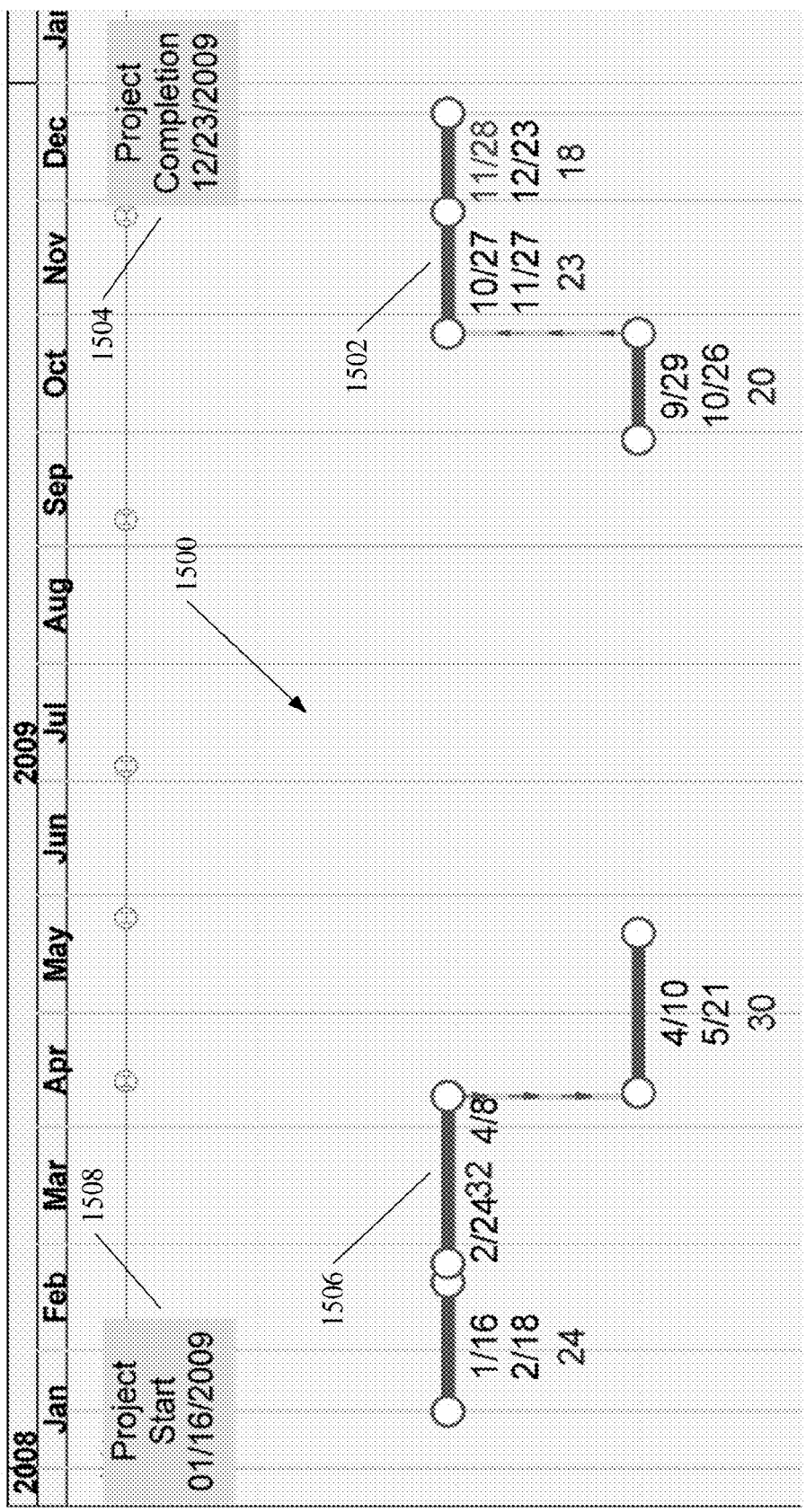
FIG. 15 is an exemplary project schedule.

In situations where many activities converge with few successors, planning may switch to a pull mode, with predecessor activities and relationships developed backwards from already defined successor activities. Accordingly, the system may allow activity definition, sequencing and dating to proceed in a push/pull fashion. This is relevant to construction planning in that deliveries may allow the release of work, which suggests that work dependent on deliveries may best be sequenced using "push techniques." The system facilitates building the network backwards and allows a user to spontaneously switch from forward to backward network development, and vice-versa. FIG. 15 illustrates how an exemplary schedule 1500 may be planned utilizing both forward and backward network development. As shown, the schedule 1500 is being developed in the backward direction 1502 from a known completion day 1504, and in the forward direction 1506 from a known start date 1508. The schedule 1500 may created from both directions where the network meets in the middle to complete the plan.

Figure 16:
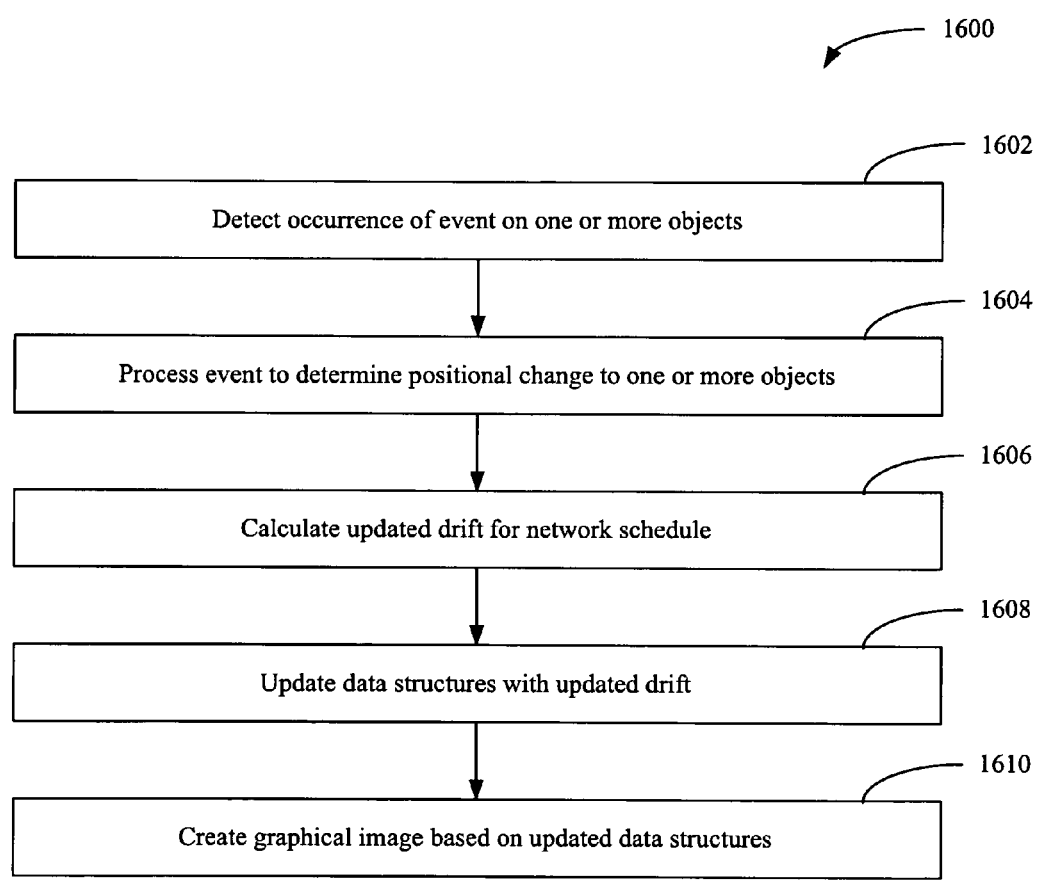
FIG. 16 is a flow chart of one example of backward planning a schedule.

A flow diagram illustrating an exemplary process for backward planning a schedule to determine an optimal start date of a project based on a known completion date is shown in FIG. 16. The process 1600 may be implemented for use with the system in FIG. 1 or a different system. The process 1600 begins with block 1602 where the event processor detects the occurrence of an event applied to one or more objects. The process 1600 proceeds to block 1604 where the object processor processes the event to determine that the event represents a positional change to the one or more objects.

The process 1600 proceeds to block 1606 where the logic processor calculates update drift values for the network schedule based on the positional change to the one or more objects. The logic processor creates a data log of the update drift values and passes the data log to the object processor. The process 1600 proceeds to block 1608 where the object processor updates the data structures corresponding to the one or more objects based on the data log created by the logic processor. The object processor stores the updated data structures in memory. The process 1600 proceeds to block 1610 where the graphics processor creates a graphical image based on the updated data structures. The graphical image represents an optimal start date of the project computed from known completion date.

The system may also utilize as-built conditions to continuously update a schedule and allow adjustments to be made to the schedule based off the as-built conditions. Herein, as-built refers to an activity in the project that has been completed. After an activity is completed or partially completed, the activity or portion of the activity may be actualized by the system. In other words, the system may map the activity based on its as-built conditions, that is, the activity may be mapped according to its actual start date and its actual completion date. The system may determine forensic floats, forensic drifts, forensic gaps, and as-built critical paths in the schedule.

During as-built conditions, the logic relationships retain a real gap value even if the predecessor and successor activities are actualized. The forensic gap value no longer measures available slippage for the predecessor, but instead the forensic gap measures whether the logic tie was a driving relationship in the as-built condition. The float algorithms of the system rely solely on existing gaps across the entire network and therefore the calculation is not affected by whether gaps used in the equation reflect early dates, planned dates or actual dates. Unlike existing systems, the system will competently calculate forensic float and therefore competently determine the as-built critical path, whether forward (future) or behind (past side of) the data date line, including when the data date line reaches actual project completion.

The ability of the system to incorporate as-built conditions into the planning and scheduling process provides on-going project planning and project archiving. The system may provide stakeholders with up-to-date information of as-built conditions to allow stakeholders to assess the progress and make future scheduling modifications based on the progress. The system may also be useful for forensic analysis and contract disputes. For example, if a project is delayed, the system may be utilized to determine which activity is the root of the delay, and may allow the responsible party or parties to be identified. This becomes particularly important during a contract dispute or lawsuit.

They system may also be used effectively for collaborative and full wall planning sessions, which are gatherings of project stakeholders to participate in an interactive planning and scheduling session. The system provides an electronic means to practice a collaborative full wall planning session and provides all the tools necessary to link activities, graphically illustrate the critical dependencies and make them easy to edit. The transparency and intuitive nature of the system allows all stakeholders, not just scheduling experts, to actively participate in the planning and schedule process.

Figure 17:
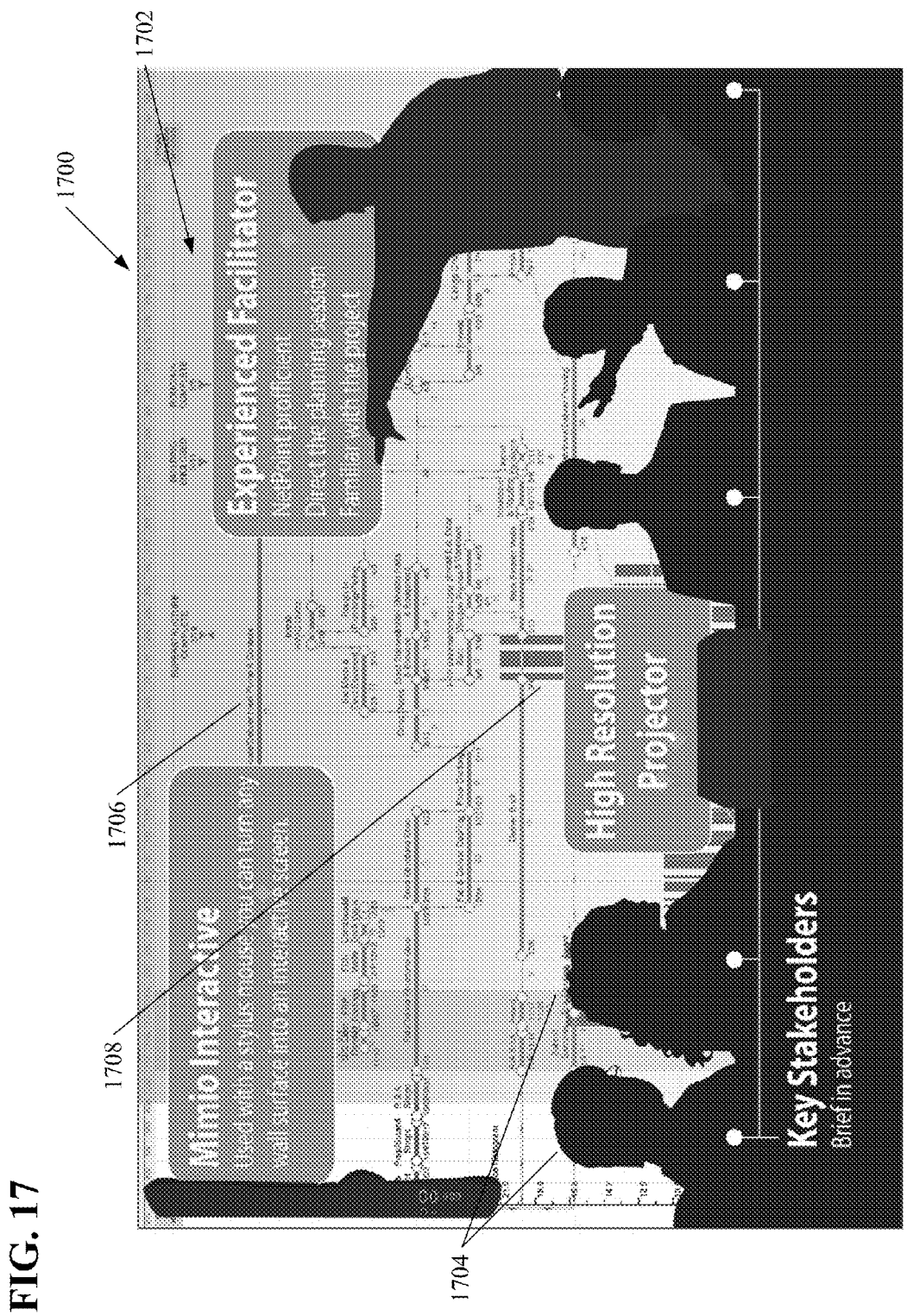
FIG. 17 is an exemplary collaborative and full wall planning session using the graphical planning and scheduling system.

An exemplary collaborative and full wall planning session 1700 is illustrated at FIG. 17. With reference to FIG. 17, the system may provide the following advantages to a full wall planning session: high resolution graphical interface 1702 that enhances the interaction between all stakeholders 1704; ability to graphically create and link network dependencies 1706; graphical nature allows network to be clearly understood and easy to create and edit; identify the resources needed to complete the project; graphical display of resources 1708 to allow for the best placement of tasks and stakeholders 1704 to plan for their level of effort; facilitation of a quick and interactive project planning and scheduling session; ability to test alternative approaches and evaluate performance; easily identify the critical path for a project; ability to add information text, annotations and information objects to enrich plan; ability to determine what action is necessary to keep project on schedule; and monitor percent complete and show the real possibility of meeting the deadline.

The system may be combined with other graphical planning technology to provide optimal results for full wall planning sessions. For example, in a room set-up for more than ten people, large, high resolution images may be attained by using a projector, such as the OPTIMA™ EP910. The OPTIMA™ EP910 may create a time-scaled display measuring 12'×6'. This projector also offers 1900×1080 resolution at 16:9 aspect ratio. From a distance of 24', the projector generates a bright, crisp 12'×6' image. Moreover, using a projected image with MIMIO INTERACTIVE™ turns the projected image into a touch screen. MIMIO INTERACTIVE™ uses a special stylus with which the facilitator may manipulate the projected image allowing for a more dynamic, collaborative process during the session. The maximum supported image width with MIMIO INTERACTIVE™ is 8' though the device will provide images up to 10' successfully. By mounting MIMIO INTERACTIVE™ to the bottom center of the image, a better coverage of large images can be achieved.

In a room set-up for less than ten people, the PANEL-WORX™ PX-42" touch screen provides a high resolution LCD touch screen with voice recognition. This integrated touch screen has 1900×1080 resolution at 16:9 aspect ratio. For mobile planning, the system can be built directly into a shipping container. Moreover, voice recognition assists the moderator to quickly input activity descriptions without interrupting collaboration flow. A recommended voice recognition software is the DRAGON NATURALLY SPEAKING™ 10.0. Handwriting recognition hardware and software may assist the moderator and stakeholders as it encourages involvement, retains levels of engagement and keeps workflow constant.

For a high resolution LCD without touch screen, the WESTINGHOUSE™ TX-42FF43os offers 1900×1080 resolution at 16:9 aspect ratio. Many other options are available for flat panel display. Alternatively, a high resolution projector with MIMIO INTERACTIVE™ such as the Hitachi CPX-445, offers native resolution of 1024×768, digital video input (DVI), 3200 ANSI lumens and 16:9 aspect ratio.

Additionally, the SANYO ULTRA SHORT THROW™ PLC-XL50 projects a large, crisp image (about 80" diagonal) and may be used for a full wall planning session as it sits on the floor, inches away from the wall or dry erase board. Because the projector sits on the floor, the facilitator does not block the projected imaged when moving around the time-scaled display to add activities and logic ties. Also, the size and shape of the room is not essential as an 80" flat surface and electrical outlet are all that is needed. The PLC-XL50 offers true XGA, 1024×768 resolution, 2000 ANSI lumens and 4:3 aspect ratio.

Additionally, while the graphics-based system empower users of all skill levels, e.g. project executives as well as field laborers, to perform network-based planning without having to learn the intricacies of traditional CPM-based software, it is recommended that a facilitator that understands the system be present at the full wall planning sessions so the stakeholders can focus on the collaborative planning and scheduling processes. The facilitator may mediate the discussion as the collaboration unfolds. The group dynamic of a full wall planning session often accelerates rapidly as collaborative contributors integrate thinking about a plan as it unfolds. During a full wall planning session, the group can collaboratively engage as additional activities or changes to existing activities impact the network. This simultaneous realization has a powerful and positive effect on the group dynamic, drawing attention to the interests and issues in question rather than intransigent staked-out positions. It is also recommended that the key stakeholders participate in the full wall planning sessions as it baselines the project team to the plan or schedule.

Figure 18:
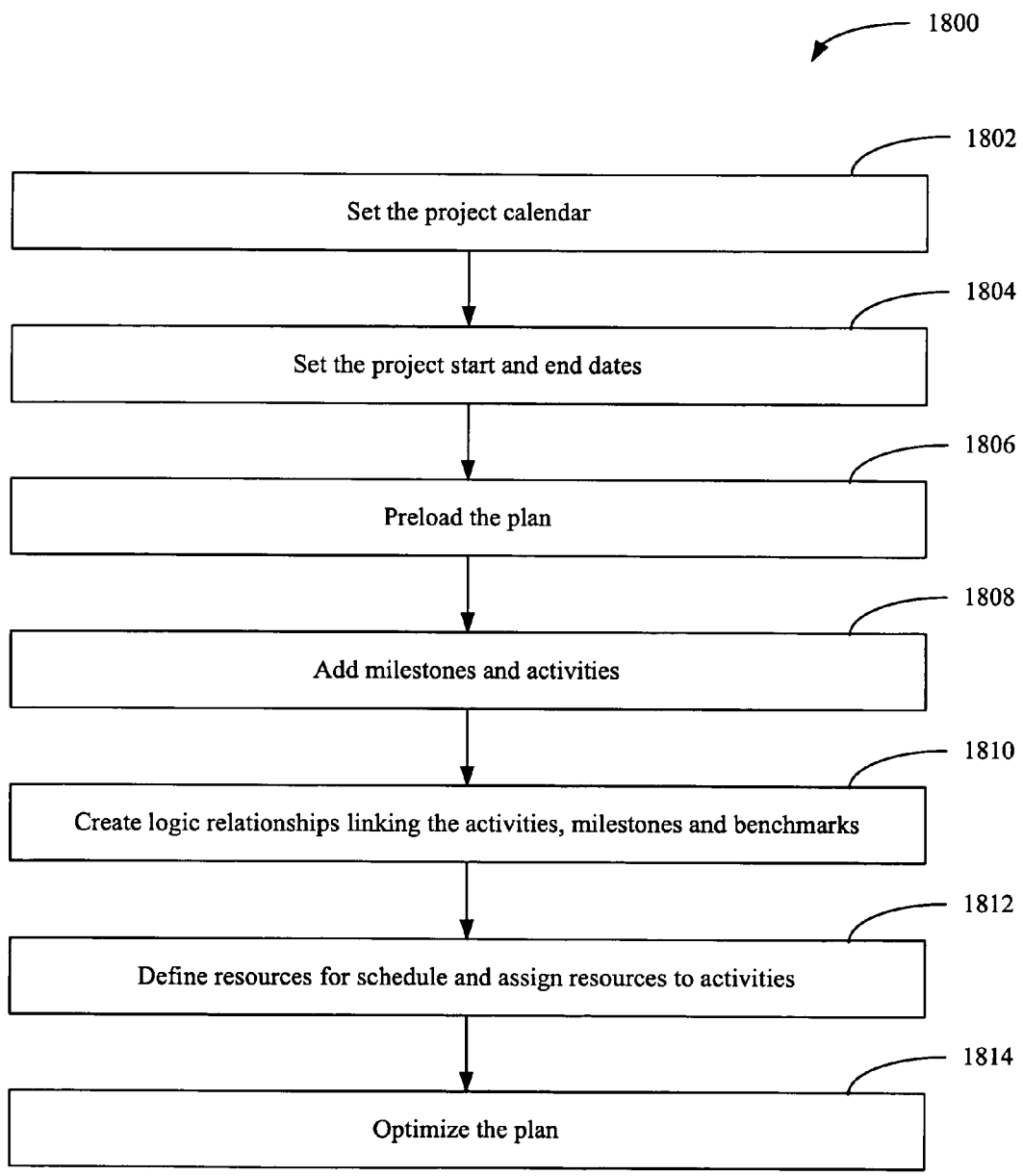
FIG. 18 is a flow chart of one example of using the graphical planning and scheduling system.

A flow diagram illustrating an exemplary process for getting started with the system is shown in FIG. 18. The process 1800 may be implemented for use with the system of FIG. 1 or a different system. The process 1800 begins with block 1802 where the project calendar is set. The calendar may be changed at any time. The process 1800 proceeds to block 1804 where the project start and completion dates are set. These dates may be adjusted at any time. In one example, to set a start and completion date, a user may bring the cursor to a desired date on the time-scaled display and right click the mouse. The user may select "Set this Date As" from the menu, then select "Project Start" or "Project End." The process 1800 proceeds to block 1806 where the plan is preloaded. The preload may include preloading the plan with known holidays, format and fill in text boxes, and preload colored activities for known activity groups to match preloaded text boxes.

The process 1800 proceeds to block 1808 where activities, milestones and benchmarks are added. There may be several benchmarks in the plan, for example, city council approval, building enclosure, substantial completion, etc. The benchmarks may be placed on the time-scaled display as place markers for these dates. As discussed herein, the activities may be placed on the time-scaled display to present real-world tasks to be completed during the life of the project. The process 1800 proceeds to block 1810 where logic relationships are created to link the activities, milestones and benchmarks. As the schedule evolves becomes more complex, activities may be dropped down a grid and the geometry of the logic relationships may be changed to prohibit an activity or logic relationship from masking another activity or logic relationship. The process 1800 then proceeds to block 1812 where resources are defined for the schedule and particular resources are assigned to the appropriate activities. The process 1800 then proceeds to block 1814 where the plan is optimized. It is recommended that the "Logic Hold" be turned on to preserve mathematical rules. The plan may be optimized by adding activities, modifying dates and durations of activities, adding embeds to define relationships, or by applying the other optimization sequences described herein. The user may save different plan iterations that address specific scenarios.

The system may also be used in virtual collaboration sessions, where geographically dispersed stakeholders can join a planning and scheduling session virtually using network conferencing applications, such as EPOP™ and WEBEX™, or other network connection. The mirroring of graphical user display enables stakeholders to rough-in a plan with other stakeholders in remote locations and enables the stakeholders to see the development of the plan as it unfolds through computer network links. Control of the schedule can be transferred to any one stakeholder to add their activities for which they are contractually responsible.

The system enables key stakeholders the potential to solve difficult problems in traditional planning and scheduling methodologies, such as CPM. In these traditional methodologies, a contractor typically develops a schedule and delivers it to the project owner, who then must spend considerable time and resources reviewing the schedule, which is oftentimes sent back for further revision, or sent back without having been fully reviewed due to time constraints. In contrast, the intuitive nature of the system enables both contractors and owners to meet and jointly review the project schedule, discuss any issues uncovered and reach mutual agreement in light of opposing interpretations of pertinent contractual requirements. Moreover, the system enables the export/import of the schedules including objects' mathematical characteristics into traditional planning and schedule methodologies, including CPM and BIM systems.

The system may be employed in any time-based project in a myriad of different fields of uses. In one example, the system may be used to improve planning ability of learners at ages where frontal cortex abilities are still improving, e.g. younger individuals such as adolescents or pre-adolescents, or individuals with learning disabilities. The frontal cortex, or frontal lobe, is the anatomy of the brain that has been correlated to the planning ability in humans. The system may be used by learners to assist and improve their planning ability. The system may provide learners with cognitive practice to establish effective planning and strategy-making abilities.

The intuitive, graphic nature of the system makes it an optimal project based learning tool for K-12 students. The system may provide these students with a more effective learning structure by encouraging them to collaborate on one or more projects and age-appropriate project management tasks. The system may be used to plan and schedule a piece of work that is undertaken or attempted and culminates with a demonstration or artifact, any planned undertaking that requires collaboration by several learners, or any goal with a true deadline require considerable effort and revisions to stay on track to accomplish the goal.

Figure 19:
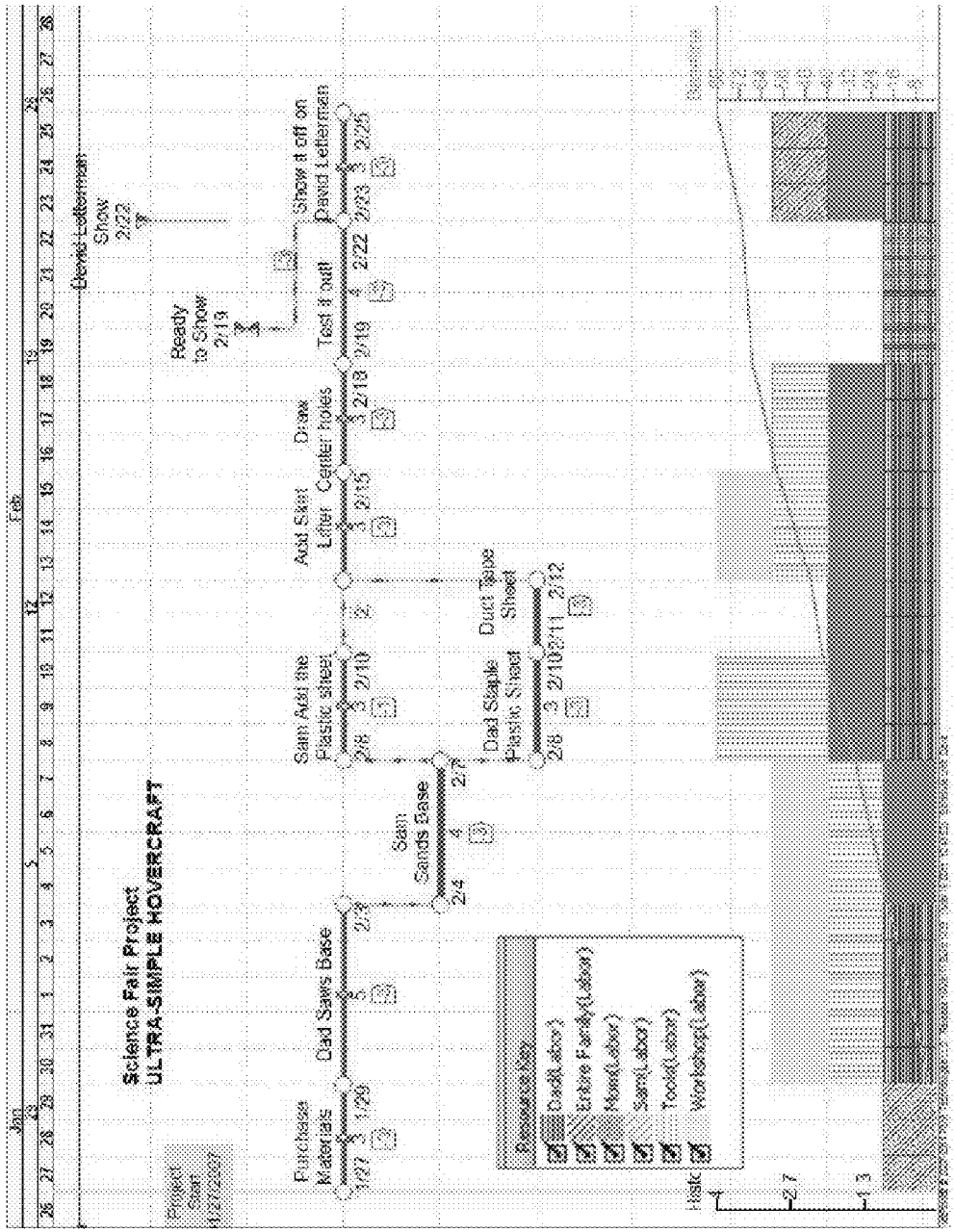
FIG. 19 is an exemplary project schedule.
Figure 20:
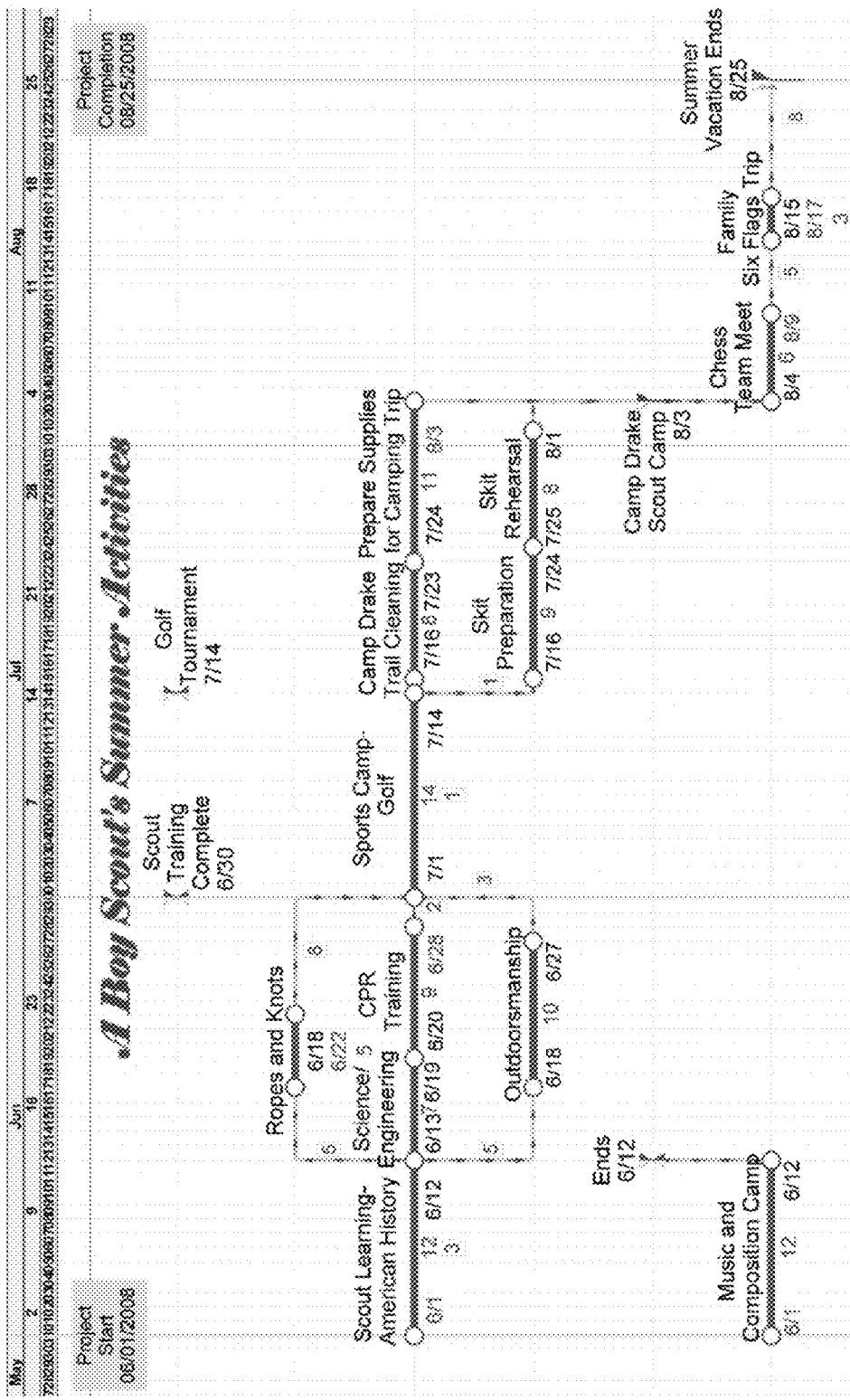
FIG. 20 is an, exemplary project schedule.

The system may be used to plan and schedule, for example, a science fair project, including selecting and submitting a topic, gaining approval, researching, building, and presenting. FIG. 19 illustrates a schedule developed for a science fair project that ended with a demonstration on the LATE SHOW™ with David Letterman. As shown, the student mapped out each of the activities that would need to be accomplished in preparation for the demonstration. The system may also be used for planning summer activities, e.g. camp activities, lining up babysitters, vacations, hobbies, back to school preparation, etc. FIG. 20 illustrates a schedule for a scout's activities over the summer. It will be appreciated the system may be utilized to plan and schedule a myriad of K-12 student projects and events.

The system may also be used as a cooperative planning tool. Herein, cooperative planning involves planning a project or event that requires at least two planning entities, e.g. two business, a contractor and government entity, instructional entities teaching project planning skills to students, two members of the same or different families planning a wedding, use by husband and wife to plan a vacation, etc. The system may be accessible by the two planning entities via a network. The system may include a restriction feature to restrict access to only those planning entities with permission to manipulate the schedule. The system may also include a lock feature that locks the plan with a code, security key, etc. after it has been developed. This feature ensures that the plan will not be changed as copies of it are distributed to the stakeholders.

The system may be used for planning a story. The art of telling a story is a skill that not all possess. Stories typically comprise multiple entities, each entity having an associated timeline of events. Some of the events on the timeline may be of interest while others may not. Providing a computer-assisted planning tool as described herein will assist creation of a story by permitting graphical planning of multiple story entities to determine when certain story events should occur. In this respect, the system may be used for planning a novel, planning a movie, planning a video game, etc.

As mentioned above, the system may be used for on-going project planning with project archiving. In some industries, it is beneficial for stakeholders to get a sense of what stage a project is in. For example, a risk assessor for a bank may evaluate a construction site to determine what next steps the bank should make with respect to financing or other bank-related activities, e.g. periodic pay draws. The risk assessor may review the schedule comprising the upcoming planned events and the project history archive. Information objects, such as still shots from the site may be linked to the graphical elements of the schedule for the risk assessor to view and make risk-related decisions. A risk-related decision may require a re-planning of a particular activity going forward. Moreover, information objects, such as a camera feed to a site, may be linked to the schedule to allow the risk assessor and/or stakeholders to view the site in real-time and make proper adjustments to the schedule.

Figure 21:
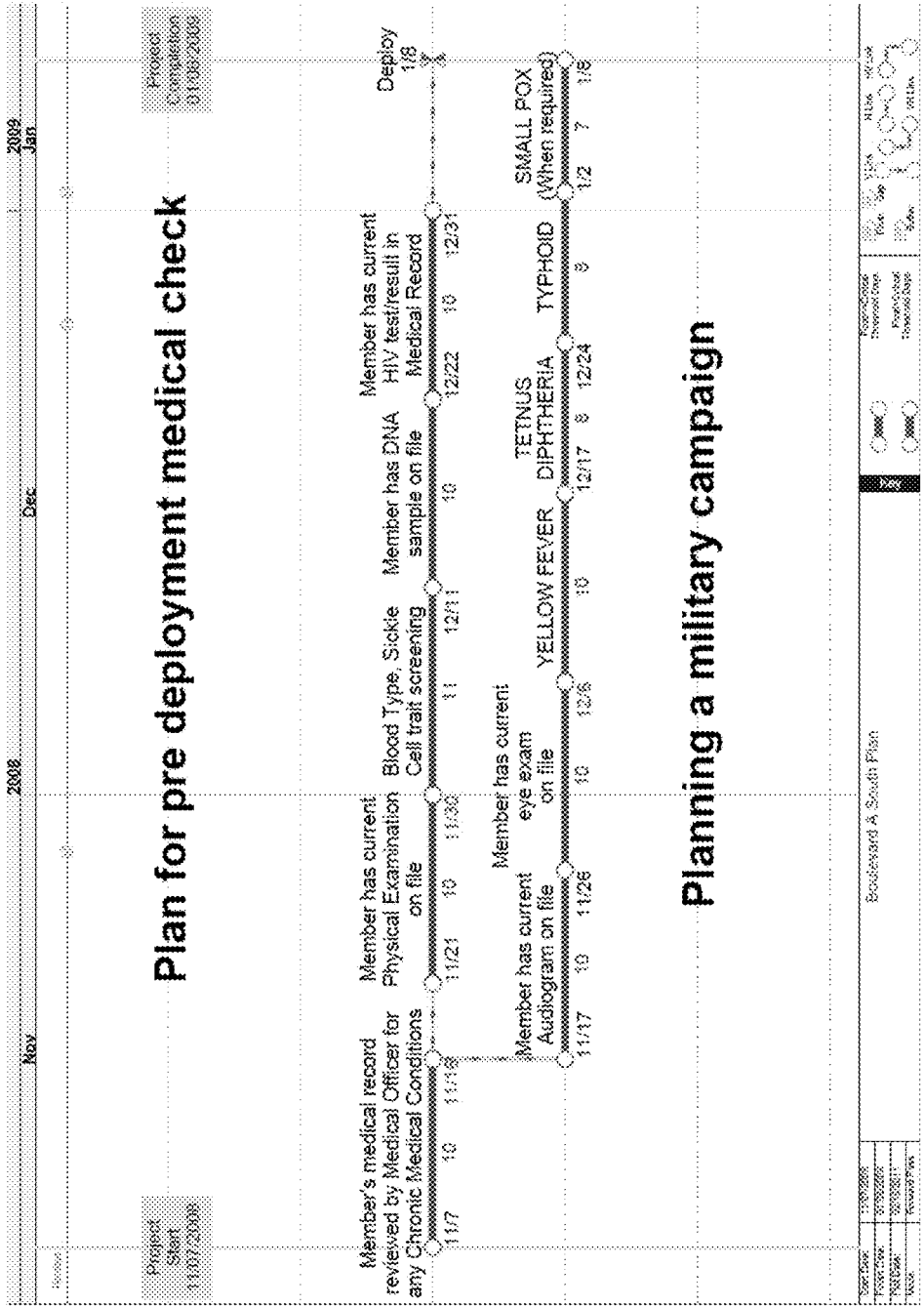
FIG. 21 is an exemplary project schedule.

The system may also be used as a journaling method to keep track of records, as evidence presenting method in a legal proceeding, as a teaching tool in construction planning or other project management field, etc. The system may also be used by the military to plan military campaigns. FIG. 21 illustrates an exemplary military campaign schedule for a pre-deployment medical check. It will be appreciated that the system may be used as a planning and scheduling tool for any time-based project.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A computer-implemented method for graphically planning and scheduling a project comprising:
  detecting a user interaction on one or more graphical objects on a time-scaled display, the one or more graphical objects being logically linked to at least one linked graphical object on the time-scaled display, the one or more graphical objects representing one of an activity, a milestone, a logic relationship, an embedded node and a benchmark and the at least one linked graphical object representing one of a different activity, a different milestone, a different logic relationship, a different embedded node and a different benchmark;
  performing one or more calculations on the one or more graphical objects in response to the user interaction, including performing a healing algorithm;
  updating data structures representative of the one or more graphical objects in response to the calculations;
  re-positioning the at least one linked graphical object on the time-scaled display, wherein the re-positioning converts a negative gap to a zero gap; and
  updating the time-scaled display based on the updated data structures.

2. The method of claim 1 wherein the user interaction comprises at least one of a mouse click, mouse movement, key press, gestural input or surface input.

3. The method of claim 1 wherein the detecting further comprises:
  monitoring the occurrence of a user interaction;
  creating a packet of data including instructions for processing the user interaction; and
  sending the packet of data to a response unit.

4. The method of claim 1 wherein the one or more calculations comprises:
  calculating one or more of a float, drift, total float, gap, resource consumption or cost.

5. The method of claim 1 wherein the performing further comprises:
  creating a modification log for the one or more graphical objects as a function of the calculating.

6. The method of claim 5 wherein the updating further comprises:
  updating the data structures as a function of the modification log.

7. The method of claim 1 wherein the detecting, performing, updating, and updating are operable to communicate in memory.

8. The method of claim 1 further comprising:
  updating data structures representative of the one or more graphical objects in response to the user interaction, and wherein the performing is based on the updated data structures.

9. The method of claim 1 wherein the user interaction is a physical manipulation of the graphical object on the time-scaled display.

10. The method of claim 1 wherein the one or more graphical objects includes one or more rules governing how the one or more graphical objects behave with respect to shifting forward and backward on the time-scaled display.

11. The method of claim 1 wherein the one or more graphical objects includes one or more rules governing a finish-to-start, a finish-to-finish, a start-to-start or a start-to-finish relationship between the one or more graphical object and the at least one linked graphical objects.

12. The method of claim 1 wherein the one or more graphical objects is the embedded node, and the embedded node is intermediate of a start node and a finish node of the one or more graphical objects.

13. The method of claim 1 wherein the performing of the one or more calculations is conducted for the one or more graphical objects and the at least one linked graphical object in response to the user interaction.

14. The method of claim 1 wherein the at least one linked graphical object includes a successor or predecessor graphical object directly linked to the one or more graphical objects and a successor or predecessor object indirectly linked to the one or more graphical objects through another link with the successor or predecessor graphical object that is directly linked to the one or more graphical objects.

15. The method of claim 1 wherein a change to a position of the one or more graphical objects by the user interaction causes a change to a position of the at least one linked graphical object on the time-scaled display, unless the position of the at least one linked object is constrained by a date rule or a link to another graphical object.

16. A system for graphically planning and scheduling a project comprising:
  a graphical user interface;
  memory;
  an event processor operable to detect a user interaction with one or more graphical objects on the graphical user interface, the one or more graphical objects being logically linked to at least one linked graphical object on the graphical user interface, the one or more graphical objects representing one of an activity, a milestone, a logic relationship, embedded node and a benchmark and the at least one linked graphical object representing one of a different activity, a different milestone, a different logic relationship, a different embedded node and a different benchmark;
    an object processor coupled with the event processor and operable to update data structures representative of the one or more graphical objects in response to the user interaction;

a logic processor coupled with the object processor and operable to perform calculations based on the updated data structures, including performing a healing algorithm; and a graphics processor coupled with the object processor and operable to display the updated data structures on the graphical user interface, wherein the graphics processor is also operable to re-position the at least one linked graphical object on the graphical user interface, wherein the re-positioning converts a negative gap to a zero gap.

17. The system of claim 16 wherein the event processor is further operable to create a data packet required to process the user interaction and send the data packet to the object processor.

18. The system of claim 16 wherein the object processor is further operable to determine if the user interaction requires a change in at least one logic, resource consumption or cost.

19. The system of claim 16 wherein the logic processor is operable to calculate at least one of a float, drift, total float, gap, resource consumption, or cost based on the updated data structures.

20. The system of claim 16 wherein the logic processor is operable to create a log of modifications resulting from the calculations.

21. The system of claim 20 wherein the logic processor is further operable to send the log to the object processor, and wherein the object processor is operable to update the data structures as a function of the log.

22. The system of claim 16 further comprising:
detection means for detecting user interaction applied to one or more graphical objects;
update means for updating data structures representative of the one or more graphical objects in response to the user interaction;
performing means for performing calculations on the updated data structures; and
display means for displaying the updated data structures in real-time on a time-scaled display.

23. A computer program product comprising software encoded in non-transitory computer-readable media, for graphically planning and scheduling a project, the software comprising instructions, operable when executed, to:
detect a user interaction with one or more graphical objects on a time-scaled display, the one or more graphical objects being logically linked to at least one linked graphical object on the time-scaled display, the one or more graphical objects representing one of an activity, a milestone, a logic relationship, an embedded node and a benchmark and the at least one linked graphical object representing one of a different activity, a different milestone, a different logic relationship, a different embedded node and a different benchmark;
perform one or more calculations on the one or more graphical objects in response to the user interaction, including performing a healing algorithm;
update data structures representative of the one or more graphical objects in response to the calculations;
re-positioning the at least one linked graphical object on the time-scaled display, wherein the re-positioning converts a negative gap to a zero gap; and
update the time-scaled display based on the updated data structures.

* * * * *